(12) United States Patent
Zheng

(10) Patent No.: US 10,404,544 B2
(45) Date of Patent: Sep. 3, 2019

(54) NETWORK TOPOLOGY DETERMINING METHOD AND APPARATUS, AND CENTRALIZED NETWORK STATUS INFORMATION STORAGE DEVICE

(71) Applicant: Huawei Technologies Co., Ltd., Shenzhen (CN)

(72) Inventor: Xiuli Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 163 days.

(21) Appl. No.: 15/467,495

(22) Filed: Mar. 23, 2017

(65) Prior Publication Data

US 2017/0195186 A1    Jul. 6, 2017

Related U.S. Application Data

(63) Continuation of application No. PCT/CN2014/087163, filed on Sep. 23, 2014.

(51) Int. Cl.
*H04L 12/24* (2006.01)
*H04L 12/26* (2006.01)

(52) U.S. Cl.
CPC .......... *H04L 41/12* (2013.01); *H04L 41/0226* (2013.01); *H04L 41/042* (2013.01); *H04L 43/0805* (2013.01)

(58) Field of Classification Search
CPC combination set(s) only.
See application file for complete search history.

(56) References Cited

U.S. PATENT DOCUMENTS 9,241,265 B2    1/2016 Puura
2013/0070638 A1    3/2013 Iovanna et al.
(Continued)

FOREIGN PATENT DOCUMENTS

CN    103346922 A    10/2013
CN    103650546 A    3/2014
(Continued)

OTHER PUBLICATIONS

Gredler, H., Ed., et al., "BGP Link-State Information Distribution Implementation Report," draft-ietf-idr-ls-distribution-impl-04, May 2, 2015, 15 pages.
(Continued)

*Primary Examiner* — Anez C Ebrahim
(74) *Attorney, Agent, or Firm* — Conley Rose, P.C.

(57) ABSTRACT

A network topology determining method and apparatus, and a centralized network status information storage device. The method includes obtaining first network status information, where the first network status information includes device information of first switching devices, link information between the first switching devices, device information of second switching devices that are connected to the first switching devices and that are not controlled by a first centralized network status information storage device, and link information between the first switching devices and the second switching devices that are respectively connected to the first switching devices; receiving second network status information sent by a second centralized network status information storage device; and determining, according to the first network status information and the second network status information, a network topology of a management domain or an autonomous system to which the first centralized network status information storage device belongs.

20 Claims, 16 Drawing Sheets

(56) References Cited

U.S. PATENT DOCUMENTS

2013/0343229 A1* 12/2013 Gasparakis ............. H04L 45/66
370/256
2014/0115154 A1 4/2014 Mack-Crane et al.

FOREIGN PATENT DOCUMENTS

| CN | 103825825 A | 5/2014 |
| WO | 2009118050 A1 | 10/2009 |
| WO | 2010105698 A1 | 9/2010 |

OTHER PUBLICATIONS

"OpenFlow Notifications Framework OpenFlow Management," ONF TS-014, Version 1.0, Oct. 15, 2013, 18 pages.
"OpenFlow Switch Specification," ONF TS-003, Version 1.2 (Wire Protocol 0x03), Dec. 5, 2011, 85 pages.
"OpenFlow Switch Specification," ONF TS-006, Version 1.3.0 (Wire Protocol 0x04), Jun. 25, 2012, 106 pages.
Chandra, R., et al., "Capabilities Advertisement with BGP-4," RFC 3392, Nov. 2002, 6 pages.
Bates, T., et al., "Multiprotocol Extensions for BGP-4," RFC 4760, Jan. 2007, 12 pages.
Bernstein, G., L., Ong., et al., "Optical Inter Domain Routing Considerations," Internet Draft, Feb. 2002, 30 pages.
Machine Translation and Abstract of Chinese Publication No. CN103825825, May 28, 2014, 9 pages.
Machine Translation and Abstract of Chinese Publication No. CN103346922, Oct. 9, 2013, 18 pages.
Foreign Communication From a Counterpart Application, European Application No. 14902330.1, Extended European Search Report dated May 26, 2017, 11 pages.
Foreign Communication From a Counterpart Application, PCT Application No. PCT/CN2014/087163, English Translation of International Search Report dated Jul. 2, 2015, 2 pages.
Foreign Communication From a Counterpart Application, PCT Application No. PCT/CN2014/087163, English Translation of Written Opinion dated Jul. 2, 2015, 4 pages.

* cited by examiner

101

Obtain first network status information, where the first network status information includes device information of first switching devices, link information between the first switching devices, device information of second switching devices connected to the first switching devices, and link information between the first switching devices and the second switching devices that are respectively connected to the first switching devices, the first switching device is a switching device that is controlled by or associated with a first centralized network status information storage device, and the second switching device is a switching device that is not controlled by or associated with the first centralized network status information storage device

102

Receive second network status information sent by a second centralized network status information storage device, where the second network status information includes device information of third switching devices, link information between the third switching devices, device information of fourth switching devices connected to the third switching devices, and link information between the third switching devices and the fourth switching devices that are respectively connected to the third switching devices, the third switching device is a switching device that is controlled by or associated with the second centralized network status information storage device, the fourth switching device is a switching device that is not controlled by or associated with the second centralized network status information storage device, and the second network status information is carried in a network layer reachability information field of an update message of the Border Gateway Protocol

103

Determine, according to the first network status information and the second network status information, a network topology of a management domain or a network to which the first centralized network status information storage device belongs

FIG. 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Error code  | Error subcode |            Data               |
+-+-+-+-+-+-+-+-+-+-+-+-+-+-+-+-+-+-+-+-+-+-+-+-+-+-+-+-+-+-+-+-+
```

FIG. 3E

```
+--------------------------------------------------------------+
|              Unreachable route length (two octets)           |
+--------------------------------------------------------------+
|              Unreachable route (changeable length)           |
+--------------------------------------------------------------+
|              Total path attribute length (two octets)        |
+--------------------------------------------------------------+
|                Path attribute (changeable length)            |
+--------------------------------------------------------------+
|                            NLRI                              |
+--------------------------------------------------------------+
```

FIG. 3F

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           NLRI type           |          Total length         |
+-+-+-+-+-+-+-+-+-+-+-+-+-+-+-+-+-+-+-+-+-+-+-+-+-+-+-+-+-+-+-+-+
|                                                              |
//                       Link status NLRI                      //
|                                                              |
+-+-+-+-+-+-+-+-+-+-+-+-+-+-+-+-+-+-+-+-+-+-+-+-+-+-+-+-+-+-+-+-+
```

FIG. 3G

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+
| Protocol identifier |
+-+-+-+-+-+-+-+-+-+-+-+-+-+-+-+-+-+-+-+-+-+-+-+-+-+-+-+-+-+-+-+-+
|                                                               |
|                      Identifier (64 bits)                     |
|                                                               |
+-+-+-+-+-+-+-+-+-+-+-+-+-+-+-+-+-+-+-+-+-+-+-+-+-+-+-+-+-+-+-+-+
//                    Local node descriptor                   //
+-+-+-+-+-+-+-+-+-+-+-+-+-+-+-+-+-+-+-+-+-+-+-+-+-+-+-+-+-+-+-+-+
```

FIG. 3H

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+
| Protocol identifier |
+-+-+-+-+-+-+-+-+-+-+-+-+-+-+-+-+-+-+-+-+-+-+-+-+-+-+-+-+-+-+-+-+
|                                                               |
|                      Identifier (64 bits)                     |
|                                                               |
+-+-+-+-+-+-+-+-+-+-+-+-+-+-+-+-+-+-+-+-+-+-+-+-+-+-+-+-+-+-+-+-+
//                    Local node descriptor                   //
+-+-+-+-+-+-+-+-+-+-+-+-+-+-+-+-+-+-+-+-+-+-+-+-+-+-+-+-+-+-+-+-+
//                    Remote node descriptor                  //
+-+-+-+-+-+-+-+-+-+-+-+-+-+-+-+-+-+-+-+-+-+-+-+-+-+-+-+-+-+-+-+-+
//                       Link descriptor                      //
+-+-+-+-+-+-+-+-+-+-+-+-+-+-+-+-+-+-+-+-+-+-+-+-+-+-+-+-+-+-+-+-+
```

FIG. 3I

NETWORK TOPOLOGY DETERMINING METHOD AND APPARATUS, AND CENTRALIZED NETWORK STATUS INFORMATION STORAGE DEVICE

CROSS-REFERENCE TO RELATED APPLICATION

This application is a continuation of International Patent Application No. PCT/CN2014/087163, filed on Sep. 23, 2014, the disclosure of which is hereby incorporated by reference in its entirety.

TECHNICAL FIELD

The present disclosure relates to the field of communications technologies, and in particular, to a network topology determining method and apparatus, and a centralized network status information storage device.

BACKGROUND

With continuous development of a software defined network (SDN) concept, a development speed of an OpenFlow network is also continuously increasing. Communications devices of the OpenFlow network mainly include an OpenFlow switch (OFS) for data forwarding and an OpenFlow controller (OFC) for logically centralized control over the entire network. In the Internet, an autonomous system (AS) is a small unit that has authority to independently decide which type of routing protocol should be used in the system. This network unit may be a simple network or may be a network group controlled by one or more ordinary network administrators, and is an individual and manageable network unit (such as a university or an enterprise). A large operator may have multiple autonomous systems, such as a wireless network autonomous system, an Internet Protocol (IP) core network autonomous system, or an IP access network autonomous system. In the present disclosure, a same management domain refers to one or more autonomous systems belonging to a same operator or community of interests. That is, in the same management domain, a scenario may exist in which multiple OpenFlow networks coexist or an OpenFlow network coexists with a non-OpenFlow network (such as a traditional IP network). Therefore, how to obtain a hybrid network topology in real time to uniformly schedule network resources in the management domain so as to ensure quality of service (QoS) becomes an important research topic.

In the prior art, a method for implementing scheduling of network status information between peer controllers (such as OFCs) is provided. In the method, using a west-east bridge mechanism, an update message is transferred using a publishing and subscription (publish/subscribe) system, so as to implement synchronization between the peer controllers, and a network topology managed by another controller may be obtained between the peer controllers using a topology recovery (VIEW-REFRESH) message.

In a process of implementing the present disclosure, the inventor finds that the prior art has at least the following problem.

The method is implemented by newly adding a VIEW-REFRESH message, and a specification regarding to the VIEW-REFRESH message is not standardized. Therefore, at present, a device that supports a standard format of the Border Gateway Protocol (which will be referred to as the Border Gateway Protocol or BGP herein) cannot identify or use the message. In addition, the method is applicable only to determining of a network topology of a single OpenFlow network or a management domain that has only multiple OpenFlow networks, and a network topology of a management domain in which an OpenFlow network coexists with a non-OpenFlow network cannot be determined.

SUMMARY

To resolve the foregoing problem in the prior art, embodiments of the present disclosure provide a network topology determining method and apparatus, and a centralized network status information storage device. The technical solutions are as follows.

According to a first aspect, an embodiment of the present disclosure provides a network topology determining method, where the method includes obtaining first network status information, where the first network status information includes device information of first switching devices, link information between the first switching devices, device information of second switching devices connected to the first switching devices, and link information between the first switching devices and the second switching devices that are respectively connected to the first switching devices, the first switching device is a switching device that is controlled by or associated with a first centralized network status information storage device, and the second switching device is a switching device that is not controlled by or associated with the first centralized network status information storage device; receiving second network status information sent by a second centralized network status information storage device, where the second network status information includes device information of third switching devices, link information between the third switching devices, device information of fourth switching devices connected to the third switching devices, and link information between the third switching devices and the fourth switching devices that are respectively connected to the third switching devices, the third switching device is a switching device that is controlled by or associated with the second centralized network status information storage device, the fourth switching device is a switching device that is not controlled by or associated with the second centralized network status information storage device, and the second network status information is carried in a network layer reachability information field of an update message (that is, a BGP Update message) of the Border Gateway Protocol; and determining, according to the first network status information and the second network status information, a network topology of a management domain or an autonomous system to which the first centralized network status information storage device belongs; where at least one of the first centralized network status information storage device or the second centralized network status information storage device is an OpenFlow controller, and the first centralized network status information storage device and the second centralized network status information storage device belong to different autonomous systems in a same management domain, or the first centralized network status information storage device and the second centralized network status information storage device belong to a same autonomous system in a same management domain.

With reference to the first aspect, in a first possible implementation manner of the first aspect, the first centralized network status information storage device and the second centralized network status information storage device are devices supporting the Border Gateway Protocol, and the device supporting the Border Gateway Protocol includes an OpenFlow controller, a routing server, a route reflector, a traffic engineering database server, or a network management system server.

With reference to the first aspect, in a second possible implementation manner of the first aspect, the network layer reachability information field includes a link status network layer reachability information field, the link status network layer reachability information field is used to indicate a source of network layer reachability information, and the source includes multiple versions of OpenFlow protocols.

With reference to the first aspect, in a third possible implementation manner of the first aspect, before the receiving second network status information sent by a second centralized network status information storage device, the method further includes receiving a first open message (that is, a BGP Open message) sent by the second centralized network status information storage device, where the first open message includes a first role information field and a first management domain information field, the first role information field is used to carry device information of the second centralized network status information storage device, and the first management domain information field is used to carry a management domain to which the second centralized network status information storage device belongs; detecting whether a value of the first role information field and a value of the first management domain information field are valid; and sending a second open message to the second centralized network status information storage device when the value of the first role information field and the value of the first management domain information field are both valid, where the second open message includes a second role information field and a second management domain information field, the second role information field is used to carry device information of the first centralized network status information storage device, and the second management domain information field is used to carry the management domain to which the first centralized network status information storage device belongs.

With reference to the third possible implementation manner of the first aspect, in a fourth possible implementation manner of the first aspect, the method further includes sending a notification message to the second centralized network status information storage device when the value of the first role information field or the value of the first management domain information field is invalid, where the notification message is used to indicate that the first open message is incorrect.

With reference to the fourth possible implementation manner of the first aspect, in a fifth possible implementation manner of the first aspect, the notification message further carries a reason for incorrectness of the first open message, and the reason for the incorrectness of the first open message includes an invalid role and an invalid management domain, where the invalid role is used to indicate that the device information of the second centralized network status information storage device is invalid, and the invalid management domain is used to indicate that the second centralized network status information storage device is not in the management domain to which the first centralized network status information storage device belongs.

With reference to the first aspect, in a sixth possible implementation manner of the first aspect, the link information between the first switching device and the second switching device is determined using a link discovery message, and the link information between the third switching device and the fourth switching device is determined using the link discovery message.

With reference to a seventh possible implementation manner of the first aspect, the determining, according to the first network status information and the second network status information, a network topology of a management domain or an autonomous system to which the first centralized network status information storage device belongs includes determining, according to the device information of the switching devices in the first network status information and the second network status information, link information between switching devices in the management domain or the autonomous system to which the first centralized network status information storage device belongs, so as to determine the network topology of the management domain or the autonomous system to which the first centralized network status information storage device belongs, where the device information includes a device identifier and a port number.

According to a second aspect, an embodiment of the present disclosure provides a network topology determining apparatus, where the apparatus includes an obtaining module configured to obtain first network status information, where the first network status information includes device information of first switching devices, link information between the first switching devices, device information of second switching devices connected to the first switching devices, and link information between the first switching devices and the second switching devices that are respectively connected to the first switching devices, the first switching device is a switching device that is controlled by or associated with a first centralized network status information storage device, and the second switching device is a switching device that is not controlled by or associated with the first centralized network status information storage device; a receiving module configured to receive second network status information sent by a second centralized network status information storage device, where the second network status information includes device information of third switching devices, link information between the third switching devices, device information of fourth switching devices connected to the third switching devices, and link information between the third switching devices and the fourth switching devices that are respectively connected to the third switching devices, the third switching device is a switching device that is controlled by or associated with the second centralized network status information storage device, the fourth switching device is a switching device that is not controlled by or associated with the second centralized network status information storage device, and the second network status information is carried in a network layer reachability information field of an update message of the Border Gateway Protocol; and a determining module configured to determine, according to the first network status information and the second network status information, a network topology of a management domain or an autonomous system to which the first centralized network status information storage device belongs; where at least one of the first centralized network status information storage device or the second centralized network status information storage device is an OpenFlow controller, and the first centralized network status information storage device and the second centralized network status information storage device belong to different autonomous systems in a same management domain, or the first centralized network status information storage device and the second centralized network status information storage device belong to a same autonomous system in a same management domain.

With reference to a first possible implementation manner of the second aspect, the first centralized network status information storage device and the second centralized network status information storage device are devices supporting the Border Gateway Protocol, and the device supporting the Border Gateway Protocol includes an OpenFlow controller, a routing server, a route reflector, a traffic engineering database server, or a network management system server.

With reference to a second possible implementation manner of the second aspect, the network layer reachability information field includes a link status network layer reachability information field, the link status network layer reachability information field is used to indicate a source of network layer reachability information, and the source includes multiple versions of OpenFlow protocols.

With reference to a third possible implementation manner of the second aspect, the receiving module is further configured to receive a first open message sent by the second centralized network status information storage device, where the first open message includes a first role information field and a first management domain information field, the first role information field is used to carry device information of the second centralized network status information storage device, and the first management domain information field is used to carry a management domain to which the second centralized network status information storage device belongs; where the apparatus further includes a detection module configured to detect whether a value of the first role information field and a value of the first management domain information field are valid; and the apparatus further includes a sending module configured to send a second open message to the second centralized network status information storage device when the value of the first role information field and the value of the first management domain information field are both valid, where the second open message includes a second role information field and a second management domain information field, the second role information field is used to carry device information of the first centralized network status information storage device, and the second management domain information field is used to carry the management domain to which the first centralized network status information storage device belongs.

With reference to the third possible implementation manner of the second aspect, in a fourth possible implementation manner of the second aspect, the sending module is further configured to send a notification message to the second centralized network status information storage device when the value of the first role information field or the value of the first management domain information field is invalid, where the notification message is used to indicate that the first open message is incorrect.

With reference to the fourth possible implementation manner of the second aspect, in a fifth possible implementation manner of the second aspect, the notification message further carries a reason for incorrectness of the first open message, and the reason for the incorrectness of the first open message includes an invalid role and an invalid management domain, where the invalid role is used to indicate that the device information of the second centralized network status information storage device is invalid, and the invalid management domain is used to indicate that the second centralized network status information storage device is not in the management domain to which the first centralized network status information storage device belongs.

With reference to a sixth possible implementation manner of the second aspect, the link information between the first switching device and the second switching device is determined using a link discovery message, and the link information between the third switching device and the fourth switching device is determined using the link discovery message.

With reference to a seventh possible implementation manner of the second aspect, the determining module is further configured to determine, according to the device information of the switching devices in the first network status information and the second network status information, link information between switching devices in the management domain or the autonomous system to which the first centralized network status information storage device belongs, so as to determine the network topology of the management domain or the autonomous system to which the first centralized network status information storage device belongs, where the device information includes a device identifier and a port number.

According to a third aspect, an embodiment of the present disclosure provides a centralized network status information storage device, where the device includes a processor, a memory, a bus, and a communications interface, where the memory is configured to store an execution instruction of a computer, the processor is connected to the memory using the bus, and when the computer runs, the processor executes the execution instruction of the computer stored in the memory, such that the computer executes the method according to any possible implementation manner of the first aspect.

The technical solutions provided in the embodiments of the present disclosure bring the following beneficial effects.

A network topology of a management domain or a network to which a first centralized network status information storage device belongs is determined by obtaining first network status information of the first centralized network status information storage device and receiving second network status information sent by a second centralized network status information storage device, which facilitates uniform scheduling of resources between different devices in a same management domain or a same network. In addition, the second network status information is carried in a network layer reachability information field of an update message of the Border Gateway Protocol, and any device supporting the Border Gateway Protocol can obtain the second network status information using the update message, to determine a network topology of a management domain or a network to which the device supporting the Border Gateway Protocol belongs, with good universality.

BRIEF DESCRIPTION OF THE DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 1 is a flowchart of a network topology determining method according to Embodiment 1 of the present disclosure;

FIG. 3E is a schematic diagram of a format of a Notification message in a BGP message in FIG. 3C;

FIG. 3F is a schematic diagram of a format of an Update message in a BGP message in FIG. 3C;

FIG. 3G is a schematic diagram of a Network Layer Reachability Information (NLRI) format in the Update message in FIG. 3F;

FIG. 3H is a schematic diagram of a node NLRI format in the NLRI format in FIG. 3G;

FIG. 3I is a schematic diagram of a link NLRI format in the NLRI format in FIG. 3G;

DETAILED DESCRIPTION

Figure 2A:
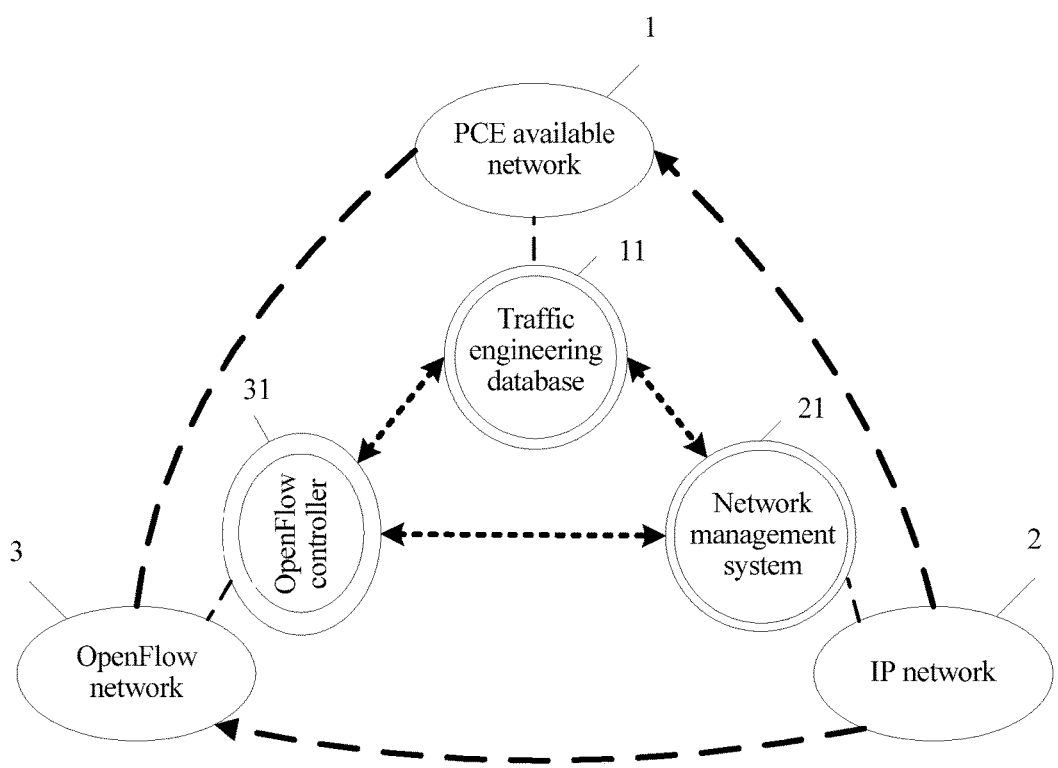
FIG. 2A is a diagram of an application scenario of a network topology determining method according to an embodiment of the present disclosure.

To make the objectives, technical solutions, and advantages of the present disclosure clearer, the following further describes the embodiments of the present disclosure in detail with reference to the accompanying drawings.

Scenarios to which the embodiments of the present disclosure are applicable include, but are not limited to, a scenario (referring to Embodiment 2) in which a management domain includes an OpenFlow network and a non-OpenFlow network, a scenario (referring to Embodiment 3) in which a management domain includes multiple OpenFlow networks, and a scenario (referring to Embodiment 4) in which an autonomous system includes an OpenFlow controller and another centralized network status information storage device (such as a traffic engineering database (TED)) other than the OpenFlow controller. An OpenFlow network or a non-OpenFlow network may be regarded as an autonomous system.

Embodiment 1

This embodiment of the present disclosure provides a network topology determining method, where the method may be executed by a first centralized network status information storage device. Referring to FIG. 1, the method includes the following steps.

Step 101: Obtain first network status information, where the first network status information includes device information of first switching devices, link information between the first switching devices, device information of second switching devices connected to the first switching devices, and link information between the first switching devices and the second switching devices that are respectively connected to the first switching devices, the first switching device is a switching device that is controlled by or associated with the first centralized network status information storage device, and the second switching device is a switching device that is not controlled by or associated with the first centralized network status information storage device.

Step 102: Receive second network status information sent by a second centralized network status information storage device, where the second network status information includes device information of third switching devices, link information between the third switching devices, device information of fourth switching devices connected to the third switching devices, and link information between the third switching devices and the fourth switching devices that are respectively connected to the third switching devices, the third switching device is a switching device that is controlled by or associated with the second centralized network status information storage device, the fourth switching device is a switching device that is not controlled by or associated with the second centralized network status information storage device, and the second network status information is carried in a network layer reachability information field of an update message of the Border Gateway Protocol.

Step 103: Determine, according to the first network status information and the second network status information, a network topology of a management domain or an autonomous system to which the first centralized network status information storage device belongs.

At least one of the first centralized network status information storage device or the second centralized network status information storage device is an OpenFlow controller, and the first centralized network status information storage device and the second centralized network status information storage device belong to different autonomous systems in a same management domain (for example, a scenario in which a management domain includes an OpenFlow network and a non-OpenFlow network, and a scenario in which a management domain includes multiple OpenFlow networks), or the first centralized network status information storage device and the second centralized network status information storage device belong to a same autonomous system in a same management domain (for example, a scenario in which an autonomous system includes an OFC and another centralized network status information storage device (such as a TED server) other than the OFC).

During implementation, the first centralized network status information storage device and the first switching device are used as an example to describe control and association. That the first centralized network status information storage device controls the first switching device means that the first centralized network status information storage device may control data forwarding and routing behaviors of the first switching device using an instruction or the like, and can obtain status information and the like of the first switching device. That the first centralized network status information storage device is associated with the first switching device means that the first centralized network status information storage device may read data stored in the first switching device, but cannot control the data forwarding or routing behavior or the like of the first switching device. Further, when the first centralized network status information storage device is an OpenFlow controller, the first switching devices are all OpenFlow switches controlled by the OpenFlow controller; when the first centralized network status information storage device is a non-OpenFlow controller, the first switching devices are all routers or switches associated with the non-OpenFlow controller. The link information between the first switching devices is link information formed between the first switching devices that are directly and mutually connected, and the second switching devices connected to the first switching devices are switching devices that are directly connected to the first switching devices.

During implementation, the first centralized network status information storage device and the second centralized network status information storage device are devices supporting the Border Gateway Protocol, where the device supporting the Border Gateway Protocol includes an OpenFlow controller, a routing server (RS), a route reflector (RR), a TED server, or a network management system (NMS) server. It should be noted that the first centralized network status information storage device and the second centralized network status information storage device refer to physical devices carrying a routing service application, a route reflection application, a TED, a network management system, an OpenFlow controller application, and the like. That is, the routing service application, the route reflection application, the TED, the network management system, the OpenFlow controller application, and the like all support the Border Gateway Protocol.

In this embodiment of the present disclosure, a network topology of a management domain or an autonomous system to which a first centralized network status information storage device belongs is determined by obtaining first network status information of the first centralized network status information storage device and receiving second network status information sent by a second centralized network status information storage device, which facilitates uniform scheduling of resources between different devices in a same management domain or a same autonomous system. In addition, the second network status information is carried in a network layer reachability information field of an update message of the Border Gateway Protocol, and any centralized network status information storage device supporting the Border Gateway Protocol can obtain the second network status information using the update message, to determine a network topology of a management domain or a network to which the centralized network status information storage device supporting the Border Gateway Protocol belongs, with good universality.

Embodiment 2

Figure 2B:
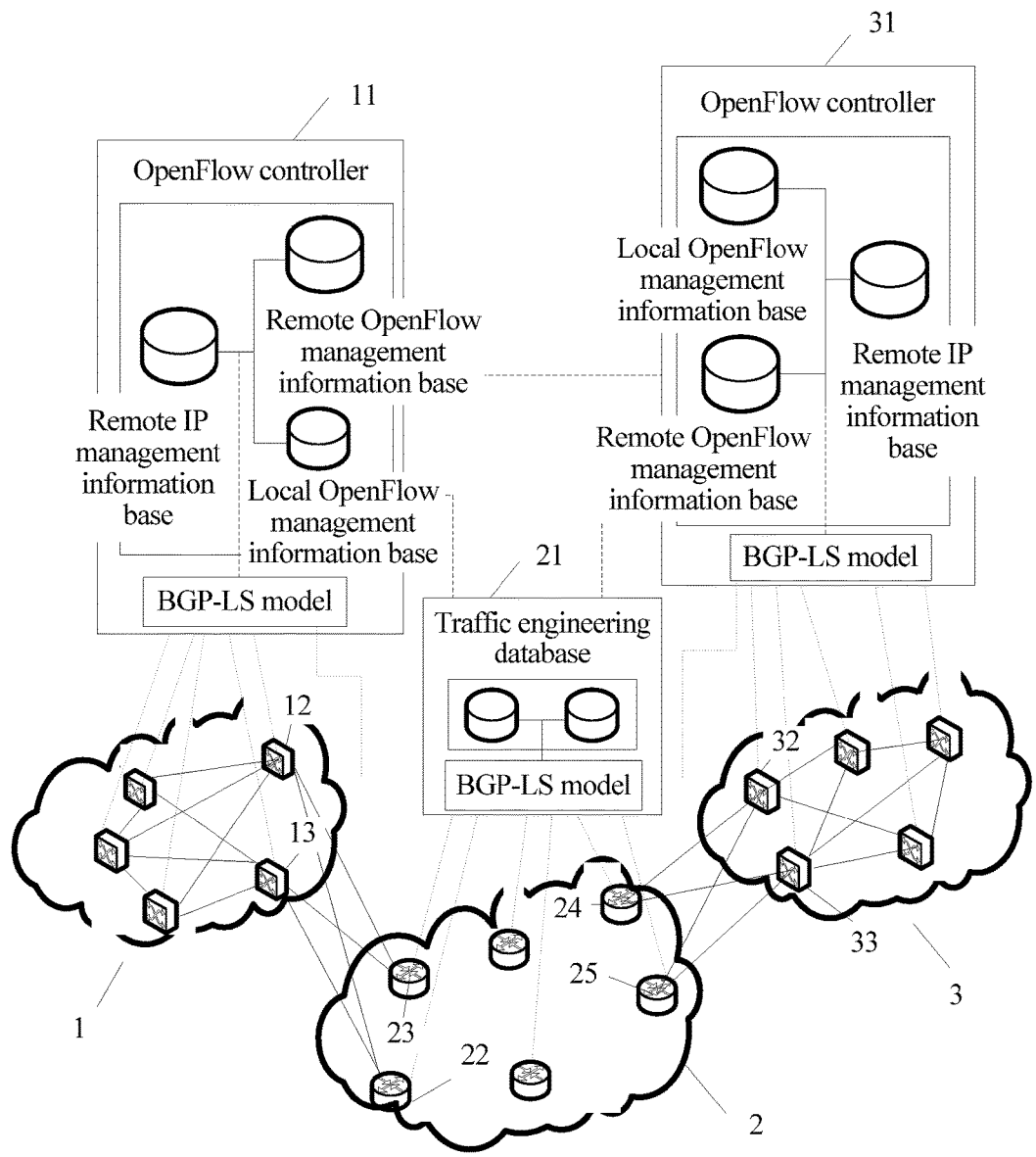
FIG. 2B is a schematic diagram of interconnection between an OpenFlow network and a non-OpenFlow network according to an embodiment of the present disclosure.

To better understand a technical solution provided in Embodiment 2 of the present disclosure, the following first briefly describes an application scenario (that is, a management domain includes an OpenFlow network and a non-OpenFlow network) of Embodiment 2 with reference to FIG. 2A. FIG. 2A shows a network architecture of a management domain. Referring to FIG. 2A, the management domain includes three networks: a network 1 that enables the Path Computation Element communication Protocol (PCEP), a traditional IP network 2, and an OpenFlow network 3, where the network 1 that enables PCEP and the IP network 2 are the foregoing non-OpenFlow networks. A TED 11 in the network 1 that enables PCEP, a NMS 21 in the IP network 2, and an OpenFlow controller 31 in the OpenFlow network 3 can communicate with each other, where the TED 11, the NMS 21, and the OpenFlow controller 31 are all configured to centrally control resources of networks to which the TED 11, the NMS 21, and the OpenFlow controller 31 respectively belong. In a practical application, the scenario shown in FIG. 2A emerges as a scenario (that is, a management domain includes one non-OpenFlow network and two OpenFlow networks, where the non-OpenFlow network is separately interconnected with the OpenFlow networks, and the two OpenFlow networks are also interconnected) shown in FIG. 2B. Referring to FIG. 2B, the management domain includes a first OpenFlow network 1, an IP network 2, and a second OpenFlow network 3, and the first OpenFlow network 1 includes an OpenFlow controller 11 and OpenFlow switches 12 and 13 that are located on an edge of one side the first OpenFlow network 1, where the OpenFlow controller 11 is used for the OpenFlow switches 12 and 13. The IP network 2 includes a TED 21 and routers 22, 23, 24, and 25 that are located on edges of two sides of the IP network 2, where the TED 21 is configured to control the routers 22, 23, 24, and 25. The second OpenFlow network 3 includes an OpenFlow controller 31 and OpenFlow switches 32 and 33, where the OpenFlow controller 31 is configured to control the OpenFlow switches 32 and 33. In addition, the OpenFlow switches 12 and 13 are mutually connected one-to-one to the routers 22 and 23 to form four links, and the routers 24 and 25 are mutually connected one-to-one to the OpenFlow switches 32 and 33 to form four links.

During implementation, a first centralized network status information storage device may be an OpenFlow controller, and a second centralized network status information storage device is a TED or an NMS in a non-OpenFlow network; or a first centralized network status information storage device is a TED or an NMS in a non-OpenFlow network, and a second centralized network status information is an OpenFlow controller. For ease of description, in this embodiment, that the first centralized network status information storage device is an OpenFlow controller and the second centralized network status information storage device is a TED in a non-OpenFlow network is used as an example for related description.

Figure 3A:
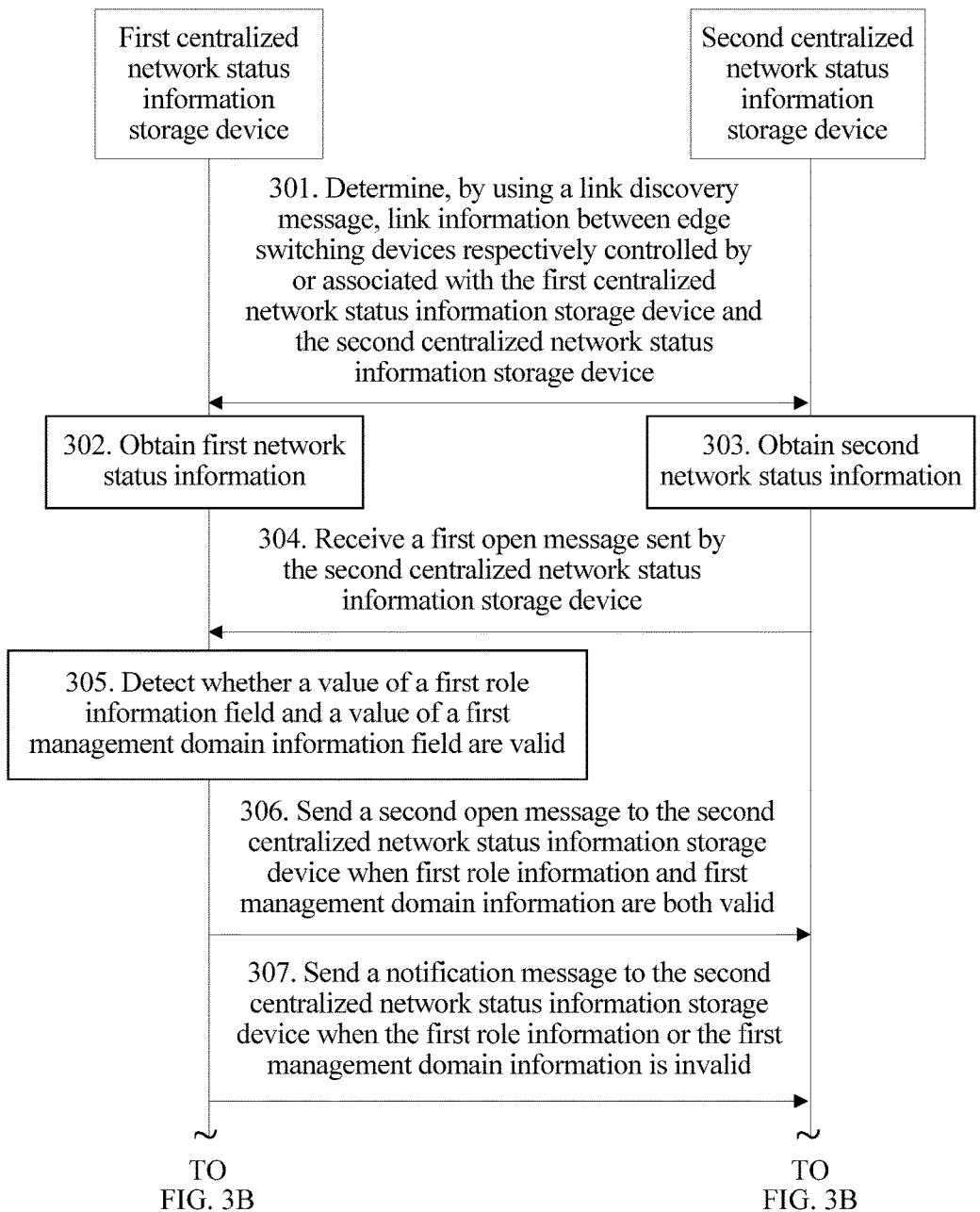
FIG. 3A and FIG. 3B are a flowchart of a network topology determining method according to Embodiment 2 of the present disclosure.
Figure 3B:
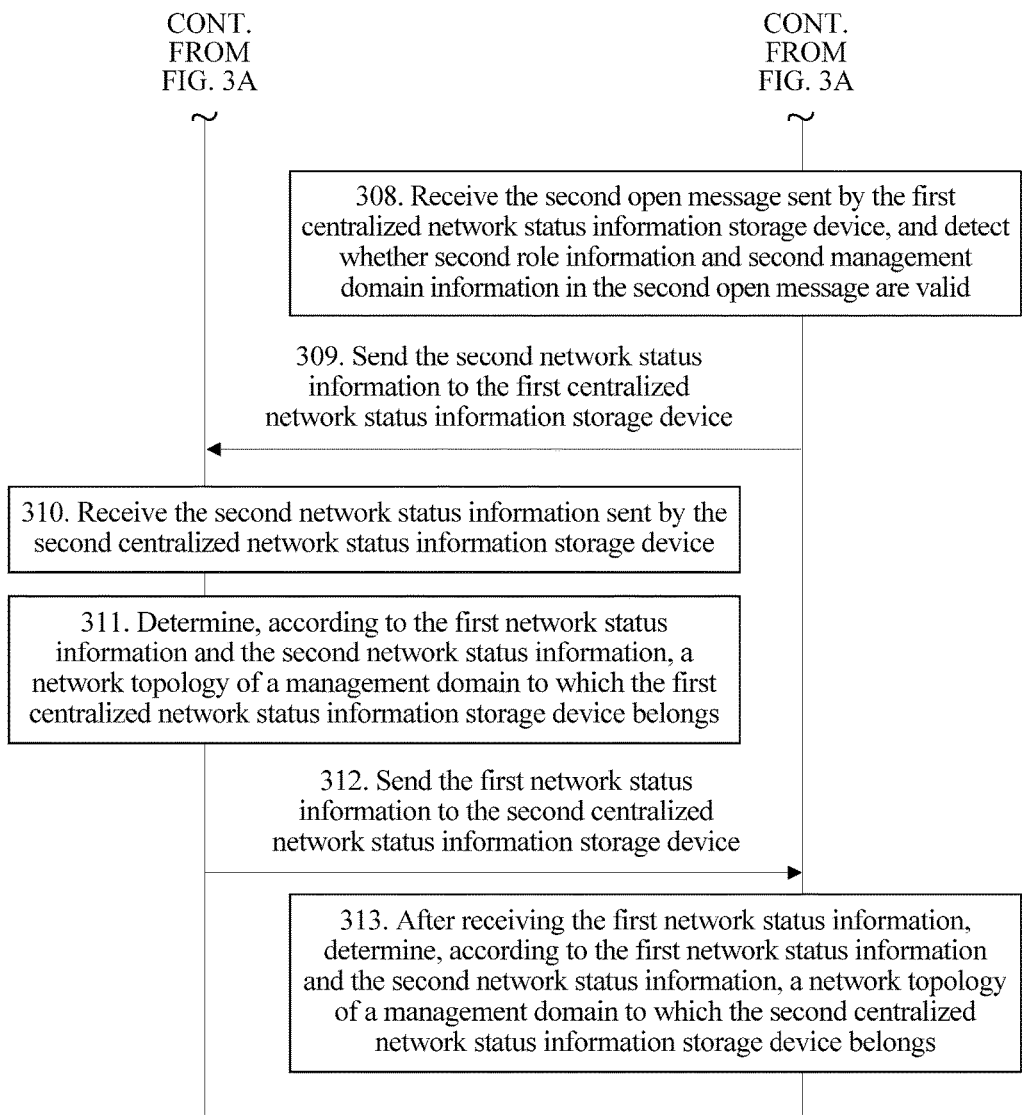

Based on the architecture shown in FIG. 2A and FIG. 2B, this embodiment of the present disclosure provides a network topology determining method. Referring to FIG. 3A and FIG. 3B, the method includes the following steps.

Step 301: Determine, using a link discovery message, link information between an edge first switching device controlled by the first centralized network status information storage device and an edge third switching device associated with the second centralized network status information storage device.

The first centralized network status information storage device and the second centralized network status information storage device may obtain the link information between the edge first switching device and the edge third switching device by transferring a Link Layer Discovery Protocol (LLDP) message. The first switching device refers to an OpenFlow switch (such as the OpenFlow switch 12) on an edge of an OpenFlow network, and the third switching device refers to a router (such as the router 22) on an edge of an IP network. The third switching device may parse reverse link information sent by the first switching device, so as to obtain the link information between the first switching device and the third switching device, and store the link information; the second centralized network status information storage device may directly read the link information stored in the third switching device.

With reference FIG. 2B, that a link discovery message is sent between the TED 21 and the OpenFlow controller 11 is used as an example. The router 22 on an edge of the IP network 2 to which the TED 21 belongs periodically broadcasts an LLDP message to a device (such as the OpenFlow switch 12 and the OpenFlow switch 13) that is directly connected to the router 22, and the OpenFlow switch 12 and the OpenFlow switch 13 send the LLDP message to the OpenFlow controller 11. After constructing a reverse link discovery message, the OpenFlow controller 11 sends the reverse link discovery message to the router 22 using the OpenFlow switch 12 or the OpenFlow switch 13. After parsing the reverse link discovery message, the router 22 obtains link information of edges of the IP network and the OpenFlow network, and stores the link information (for example, stores the link information in an edge OpenFlow (Edge OF) management information base (MIB), that is, in an Edge_OF MIB), and the TED 21 may directly read the link information of the edges of the IP network and the OpenFlow network in the MIB.

Step 302: The first centralized network status information storage device obtains first network status information.

The first network status information includes device information of the first switching devices controlled by the first centralized network status information storage device, link information between the first switching devices, device information of second switching devices connected to the first switching devices, and link information between the first switching devices and the second switching devices that are respectively connected to the first switching devices, where the second switching device is a switching device that is not controlled by the first centralized network status information storage device.

In this embodiment, the first switching devices are OFSs (such as the OpenFlow switch 13 in FIG. 2B) inside the OpenFlow network, and the link information between the first switching devices is link information between the OFSs (that is, the first switching devices) inside the OpenFlow network. The second switching devices are switching devices (such as the routers 22 and 23 in FIG. 2B) that are directly connected to the first switching devices in the non-OpenFlow network and the OpenFlow network. The OpenFlow controller may obtain device information of the OFSs and the link information between the OFSs according to a related rule of a specific protocol used by the OpenFlow controller, that is, internal network status information of the OpenFlow network in this embodiment. In addition, the OpenFlow controller may construct the reverse link discovery message and determine the device information of the second switching devices connected to the first switching devices, and the link information between the first switching devices and the second switching devices that are respectively connected to the first switching devices.

During implementation, the OpenFlow controller may store the device information of the first switching devices, the link information between the first switching devices, the device information of the second switching devices connected to the first switching devices, and the link information between the first switching devices and the second switching devices that are respectively connected to the first switching devices in a local OpenFlow management information base (Local_OF MIB).

Step 303: The second centralized network status information storage device obtains second network status information.

The second network status information includes device information of third switching devices controlled by the second centralized network status information storage device, link information between the third switching devices, device information of fourth switching devices connected to the third switching devices, and link information between the third switching devices and the fourth switching devices that are respectively connected to the third switching devices, where the fourth switching device is a switching device that is not controlled by the second centralized network status information storage device.

Similarly, the TED may also obtain the device information of the third switching devices and the link information between the third switching devices according to a related rule of a specific protocol used by the TED, and determine the device information of the fourth switching devices connected to the third switching devices, and the link information between the third switching devices and the fourth switching devices that are respectively connected to the third switching devices.

Step 304: The first centralized network status information storage device receives a first open message sent by the second centralized network status information storage device.

The first open message may include first role information and first management domain information, where the first role information is used to indicate device information of the second centralized network status information storage device, and the first management domain information field is used to indicate a management domain to which the second centralized network status information storage device belongs. During implementation, the first role information and the first management domain information may be stored in an optional parameter field of the first open message.

The third switching devices are controlled by the second centralized network status information storage device, and may be routers or the like. A format of the first open message is the same as a format of an Open message in BGP, that is, the first open message is implemented by extending an existing BGP Open message.

Figure 3C:
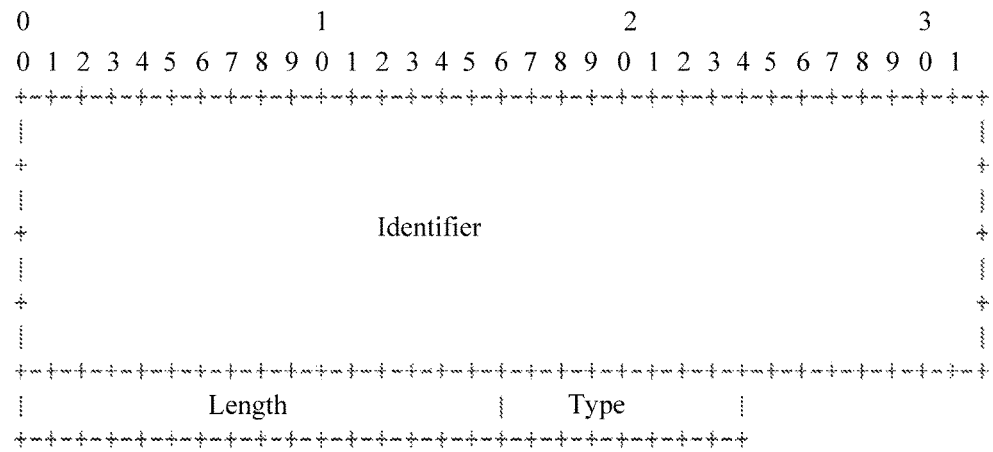
FIG. 3C is a schematic diagram of a format of a Border Gateway Protocol message header (BGP message header) according to an embodiment of the present disclosure.
Figure 3D:
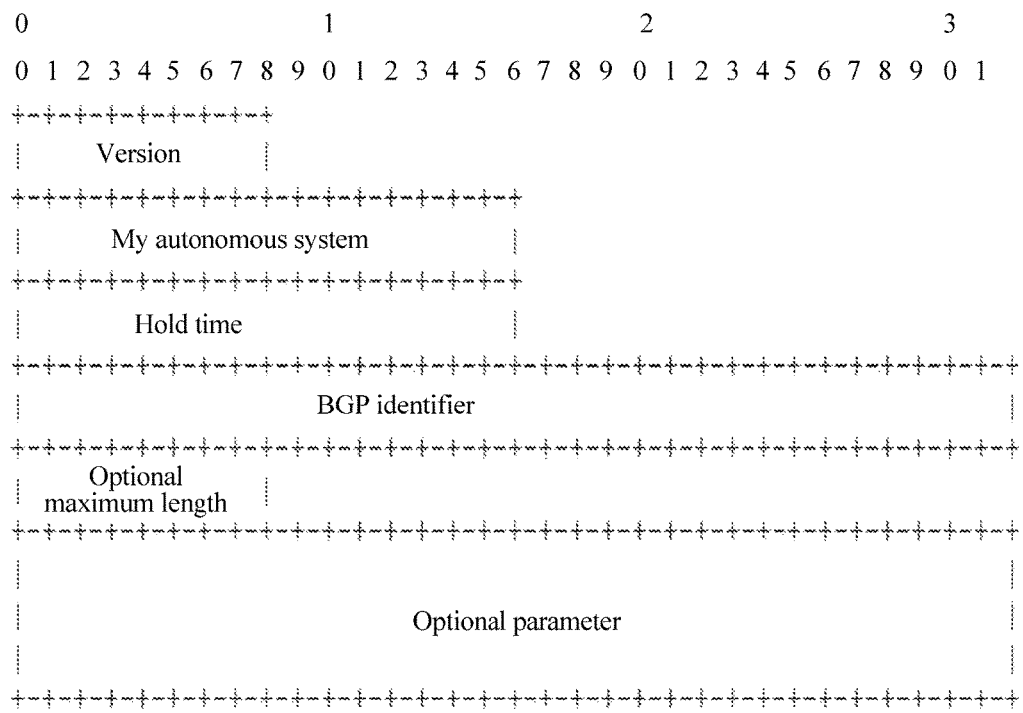
FIG. 3D is a schematic diagram of a format of an Open message in a BGP message in FIG. 3C.

The following describes a structure and a type of a BGP message with reference to FIG. 3C and FIG. 3D. Referring to FIG. 3C, a BGP message header includes three fields of a mark, a length, and a type, where the mark field is used to detect whether a peer is synchronized with a local end, the length field is used to represent a byte length of the BGP message header, and the type field is used to represent a message type of the message header. For example, Type=1 represents an open message, Type=2 represents an update message, and Type=3 represents a notification message.

When Type=1, it is indicated that the BGP message is an Open message. Referring to FIG. 3D, the open message includes six fields of a version, my autonomous system, hold time, a BGP identifier, an optional maximum length (Opt Parm Len), and an optional parameter. The version field is used to carry a running version of the BGP protocol, and the optional parameter field may extend the BGP protocol, where a length of the optional parameter field is changeable.

In this embodiment, device information and a management domain of the first centralized network status information storage device or the second centralized network status information storage device may be carried by adding a role information field and a management domain information field in the optional parameter field in the open message.

Both the role information field and the management domain information field comply with a parameter format of the BGP Open message, which includes three fields of a capability code, a capability length, and a capability value. Generally, a capability length field in the role information field may have four bytes, and a capability length field in the management domain information field may have eight bytes. Only a part of a capability value field in the role information field may be used, and the rest is reserved. Different values of the capability value field may correspond to different devices. Generally, a value of a capability value field in the management domain information field is represented using a globally unique identity, where the globally unique identity may be manually set. During implementation, role information and management domain information may use values of any two unused optional parameters. For example, a value 10 may be used to represent the role information, and a value 11 may be used to represent the management domain information. As an example, that different values of the capability value field in the role information field correspond to different device information may be a value 1 of the capability value field in the role information field represents an OFC, a value 2 of the capability value field in the role information field represents a routing server, a value 3 of the capability value field in the role information field represents a route reflector, a value 4 of the capability value field in the role information field represents a traffic engineering database server, and so on.

It is easily understood that in a practical application, different values may be set for a device according to an actual requirement, to correspond to different device information. Any device supporting the Border Gateway Protocol should be thought to be capable of adding a value of a corresponding role information field in the role information to record information of the device. The first centralized network status information storage device and the second centralized network status information storage device are devices supporting the Border Gateway Protocol, and the device supporting the Border Gateway Protocol includes, but is not limited to, an OpenFlow controller, a routing server, a route reflector, a traffic engineering database server, or a network management system server.

It should be noted that there is no sequence in performing step 302, step 303, and step 304.

Step 305: The first centralized network status information storage device detects whether a value of a first role information field and a value of a first management domain information field are valid in the first open message. If the value of the first role information field and the value of the first management domain information field are valid, perform step 306; or if the value of the first role information field or the value of the first management domain information field is invalid, perform step 307.

In this embodiment, detecting whether the value of the first role information field and the value of the first management domain information field are valid may include determining whether a value of a capability value field in the first role information field matches a preset value; and when the value of the capability value field in the first role information field matches the preset value, determining that the value of the first role information field is valid; or when the value of the capability value field in the first role information field does not match the preset value, determining that the value of the first role information field is invalid.

For example, after receiving a first open message (in which a value of a capability value field is 4), the OpenFlow controller finds, by detection, that the value of the capability value field is a preset value in the BGP protocol, and therefore considers the value of the first role information field to be valid. After receiving another first open message (in which a value of a capability value field is 8), if the OpenFlow controller finds, by detection, that 8 is not the preset value in the BGP protocol, and therefore considers the value of the first role information field to be invalid in this case.

Detecting whether the value of the first management domain information field is valid may include determining whether the management domain to which the second centralized network status information storage device belongs is the same as the management domain to which the first centralized network status information storage device belongs; and when the management domain to which the second centralized network status information storage device belongs is the same as the management domain to which the first centralized network status information storage device belongs, determining that the first management domain information is valid.

In this embodiment, when a value (that is, a globally unique identity) of a capability value field in the management domain information field in the first open message is consistent with a globally unique identity of the management domain to which the first centralized network status information storage device belongs, the value of the first management domain information field is determined to be valid; or when the value of the capability value field in the management domain information field in the first open message is inconsistent with the globally unique identity of the management domain to which the first centralized network status information storage device belongs, the value of the first management domain information field is determined to be invalid.

Step 306: The first centralized network status information storage device sends a second open message to the second centralized network status information storage device.

An optional parameter field in the second open message may include a second role information field and a second management domain information field, where the second role information field is used to carry the device information of the first centralized network status information storage device, and the second management domain information field is used to carry the management domain of the first centralized network status information storage device.

It is easily understood that after receiving the second open message, the second centralized network status information storage device also detects whether values of the second role information field and the second management domain information field are valid.

Step 307: The first centralized network status information storage device sends a notification message to the second centralized network status information storage device.

The notification message is used to indicate that the first open message is incorrect.

Further, the notification message may carry a reason for incorrectness of the first open message. The notification message may include an invalid role field and an invalid management domain field, where the invalid role field is used to indicate that the device information of the second centralized network status information storage device is invalid, and the invalid management domain field is used to indicate that the second centralized network status information storage device is not in the management domain to which the first centralized network status information storage device belongs.

A format of the notification message is the same as a format of a notification message in BGP. Referring to FIG. 3E, that is, a notification message represented when Type=3 in FIG. 3C, the notification message includes three fields of an error code, an error subcode, and data, where different values of the error code field may correspond to different types of errors. A value 1 of the error code field represents a message header error, a value 2 of the error code field represents an error of an open message, a value 3 of the error code field represents an error of an update message, a value 4 of the error code field represents timeout of hold time, a value 5 of the error code field represents a finite state machine (FSM) error, and a value 6 of the error code field represents an ending.

The error subcode field may also have different values to further describe reasons why various types of errors occur. A value 1 of the error subcode field represents an unsupported version number, a value 2 of the error subcode field represents an unsupported AS, a value 3 of the error subcode field represents an unsupported BGP identifier, a value 4 of the error subcode field represents an unsupported optional parameter, a value 5 of the error subcode field is reserved, and a value 6 of the error subcode field represents unsupported hold time.

In this embodiment, the values of the error subcode field may be extended, that is, values of the error subcode field that are corresponding to an invalid role and an invalid management domain are added to indicate reasons why an error occurs in an open message. For example, a value 7 of the error subcode field represents the invalid role, and a value 8 of the error subcode field represents the invalid management domain. It should be noted that if a role is not supported by a recipient, the value of the error subcode field needs to be set to 7, and if the first centralized network status information storage device and the second centralized network status information storage device belong to different management domains, the value of the error subcode field needs to be set to 8.

Step 308: The second centralized network status information storage device receives the second open message sent by the first centralized network status information storage device, and detects whether second role information and second management domain information in the second open message are valid.

Herein, methods in which the second centralized network status information storage device detects and processes the second role information and the second management domain information are respectively the same as the foregoing steps 305 to 307, but an execution body is the second centralized network status information storage device, and details are not described herein again.

Step 309: The second centralized network status information storage device sends the second network status information to the first centralized network status information storage device.

Step 310: The first centralized network status information storage device receives the second network status information sent by the second centralized network status information storage device.

During implementation, the second network status information is carried in a network layer reachability information field of an update message of the Border Gateway Protocol. A protocol identifier field in a link status network layer reachability information field in the network layer reachability information field is used to indicate a source of network layer reachability information, and the source includes multiple versions of OpenFlow protocols.

Referring to FIG. 3F, that is, an update message represented when Type=2 in FIG. 3C, the update message includes five fields of an unreachable route length (Withdrawn Routes Length), an unreachable route (Withdrawn Routes), a total path attribute length, a path attribute, and NLRI, where a length of the NLRI field is changeable.

Referring to FIG. 3G, the NLRI field may include three fields of an NLRI type, a total length (Total NLRI Length), and link status network layer reachability information (Link-State NLRI) (that is, link status NLRI). The link status NLRI field may be used to indicate a source of NLRI information. The NLRI type field indicates a type of the NLRI in the update message, which generally includes four types. In addition, when a value of the NLRI type field is 1, it is indicated that the NLRI type is an NLRI node (Node NLRI); when the value of the NLRI type field is 2, it is indicated that the NLRI type is an NLRI link (Link NLRI); when the value of the NLRI type field is 3, it is indicated that the NLRI type is NLRI of an IPv4 topology prefix; when the value of the NLRI type field is 4, it is indicated that the NLRI type is NLRI of an IPv6 topology prefix.

Figure 3J:
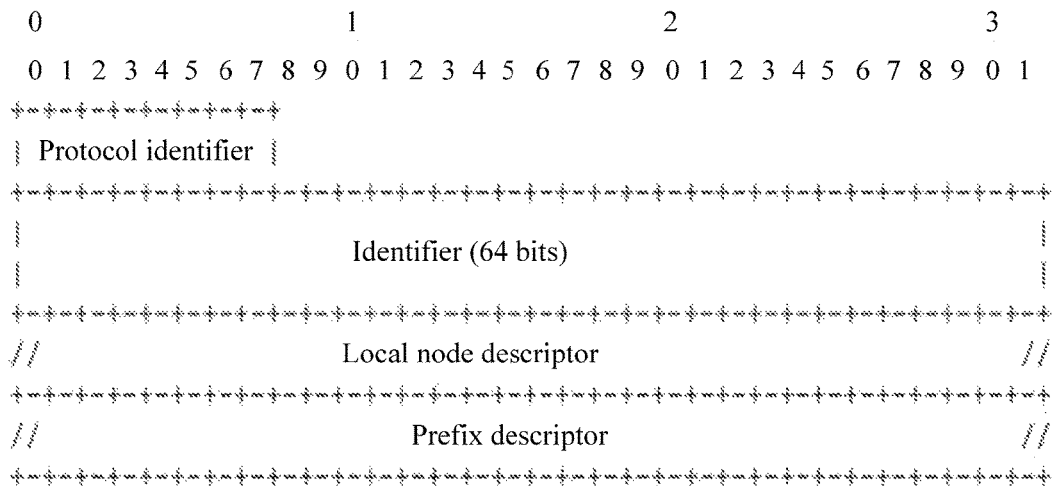
FIG. 3J is a schematic diagram of a prefix NLRI format in the NLRI format in FIG. 3G.

A format of the NLRI node (Node NLRI) is used as an example to describe the link status NLRI. Referring to FIG. 3H, the NLRI node includes three fields of a protocol identifier (Protocol-ID), an identifier, and a local node descriptor. A value of the protocol identifier field indicates a protocol version that the NLRI follows, and a value of the identifier field is an identifier (which may be an IP address or the like) of a device that sends the NLRI. Referring to FIG. 3I, the Link NLRI includes five fields of a Protocol-ID, an identifier, a local node descriptor, a remote node descriptor, and a link descriptor. Referring to FIG. 3J, the Prefix NLRI includes four fields of a Protocol-ID, an identifier, a local node descriptor, and a prefix descriptor.

In this embodiment, the value of the Protocol-ID field in the NLRI in the update message may be extended, such that an original BGP supports NLRI information collected using different versions of OpenFlow protocols, so as to obtain various types of network status information. During implementation, the protocol identifier in the NLRI may be set to different values to correspond to different sources of the NLRI. For example, Protocol-ID=0 indicates that a source of the NLRI information cannot be determined; Protocol-ID=1 indicates that the NLRI information originates from a level 1 of the IS-IS (Intermediate System to Intermediate System, Intermediate System to Intermediate System) protocol; Protocol-ID=2 indicates that the NLRI information originates from a level 2 of the IS-IS protocol; Protocol-ID=3 indicates that the NLRI information originates from the Open Shortest Path First (OSPF) protocol; Protocol-ID=4 indicates that the NLRI information originates from a native interface status; Protocol-ID=5 indicates that the NLRI information originates from a static configuration; Protocol-ID=6 indicates that the NLRI information is collected using the OF protocol 1.0; Protocol-ID=7 indicates that the NLRI information is collected using the OF protocol 2.0; Protocol-ID=8 indicates that the NLRI information is collected using the OF protocol 3.0. During implementation, the OpenFlow controller may store the second network status information in a remote IP management information base (Remote_IP MIB).

After receiving the second network status information, the OpenFlow controller obtains, by parsing, link information from a router on an edge of the non-OpenFlow network to an OFS on an edge of the OpenFlow network, and stores the link information in the remote IP management information base. In addition, the reverse link discovery message is constructed, and the reverse link discovery message and the first network status information are sent to the OFS on the edge. After receiving the reverse link discovery message, the edge OFS converts the reverse link discovery message into a standard LLDP message, and then sends the standard LLDP message to the router on the edge of the non-OpenFlow network that is directly connected to the edge OFS. The edge router parses the received LLDP message to obtain reverse link information of the OpenFlow network and the non-OpenFlow network, stores the reverse link information in a border OpenFlow management information base (Edge_OF MIB) for reading by a TED, and sends the first network status information to the TED at the same time.

At the same time, the TED in the non-OpenFlow network further stores device information of third switching devices that are controlled by the TED and link information between the third switching devices in a local IP management information base (Local_IP MIB).

Step 311: The first centralized network status information storage device determines, according to the first network status information and the second network status information, a network topology of a management domain to which the first centralized network status information storage device belongs.

During implementation, device information of a same device is stored using different identifiers in an OpenFlow network and an IP network. For example, a 64-bit identifier may be used in the OpenFlow network, but a 48-bit Media Access Control address is used in the IP network. The OpenFlow controller may separately parse different identifiers of the same device, and perform matching between the identifiers. If the matching is successful, matching between port numbers is then performed, to determine a network topology of a management domain to which the OpenFlow controller belongs. For example, with reference to FIG. 2B, a Local_OF MIB in an OpenFlow controller 1 stores the first network status information: a DPID_AR_11, a port number 1, a DPID_eOFS_11, and a port number 2; a remote IP management information base in the OpenFlow controller 1 stores the second network status information: a MAC_eOFS_11, a port number 3, a MAC_AR_11, and a port number 4. The DPID_AR_11 and the DPID_eOFS_11 are device identifiers in the OpenFlow network, and the MAC_eOFS_11 and the MAC_AR_11 are device identifiers in the IP network. The OpenFlow controller 1 first parses identifiers in the DPID_AR_11 and the MAC_AR_11, and detects whether the identifiers are consistent. If the identifiers are consistent, matching between the port number 1 and the port number 4 is then performed to detect whether the port number 1 and the port number 4 are consistent, and if the port number 1 and the port number 4 are consistent, identifiers in the DPID_eOFS_11 and the MAC_eOFS_11 are further parsed, and whether the identifiers are consistent is detected. If the identifiers are consistent, matching between the port number 2 and the port number 3 is then performed to detect whether the port number 2 and the port number 3 are consistent, and if the port number 2 and the port number 3 are consistent, a link between the eOFS_11 (the OpenFlow switch 12) and the AR_11 (that is, the router 22) is determined.

It should be noted that there is no sequence in performing step 310 and step 311.

Step 312: The first centralized network status information storage device sends the first network status information to the second centralized network status information storage device.

Step 313: After receiving the first network status information, the second centralized network status information storage device determines, according to the first network status information and the second network status information, a network topology of a management domain to which the second centralized network status information storage device belongs.

An implementation manner of step 313 is the same as that of step 310 and 311, but an execution body is the second centralized network status information storage device, and details are not described herein again.

In this embodiment of the present disclosure, a network topology of a management domain in which an OpenFlow network and a non-OpenFlow network co-exist is determined using first network status information obtained by and second network status information received by a first centralized network status information storage device located in the OpenFlow network, where the second network status information is sent by a second centralized network status information storage device located in the non-OpenFlow network. In addition, the second centralized network status information storage device may also determine, according to the second network status information obtained by the second centralized network status information storage device and the received first network status information sent by the first centralized network status information storage device, the network topology of the management domain in which the OpenFlow network and the non-OpenFlow network co-exist, which facilitates uniform scheduling of resources between different devices in a same management domain. In addition, the second network status information is carried in a network layer reachability information field of an update message of the Border Gateway Protocol, and any device supporting the Border Gateway Protocol can obtain the second network status information using the update message, to determine a network topology of a management domain or a network to which the device supporting the Border Gateway Protocol belongs, with good universality.

Embodiment 3

Figure 4:
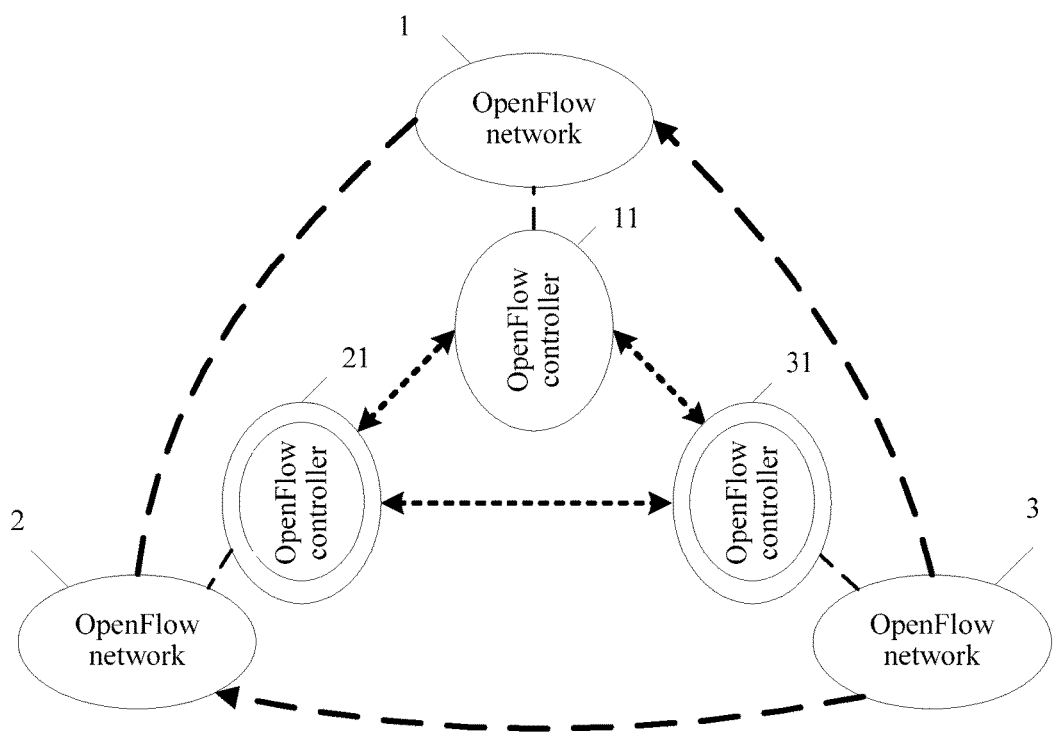
FIG. 4 is a diagram of an application scenario of another network topology determining method according to an embodiment of the present disclosure.

To better understand a technical solution provided in Embodiment 3 of the present disclosure, the following first describes an application scenario (that is, a scenario in which a management domain includes multiple OpenFlow networks) of Embodiment 3 with reference to FIG. 4. FIG. 4 shows a network architecture of a management domain. Referring to FIG. 4, three OpenFlow networks 1, 2, and 3 are deployed in the management domain, and OpenFlow controllers 11, 21, and 31 are configured in each OpenFlow network. In addition, each OpenFlow network implements communication with an OpenFlow controller of another network using an OpenFlow controller of each OpenFlow network.

In this embodiment, a first centralized network status information storage device and a second centralized network status information storage device are OpenFlow controllers in different networks of a same management domain. That is, the first centralized network status information storage device is a first OpenFlow controller, and the second centralized network status information storage device is a second OpenFlow controller.

Figure 5A:
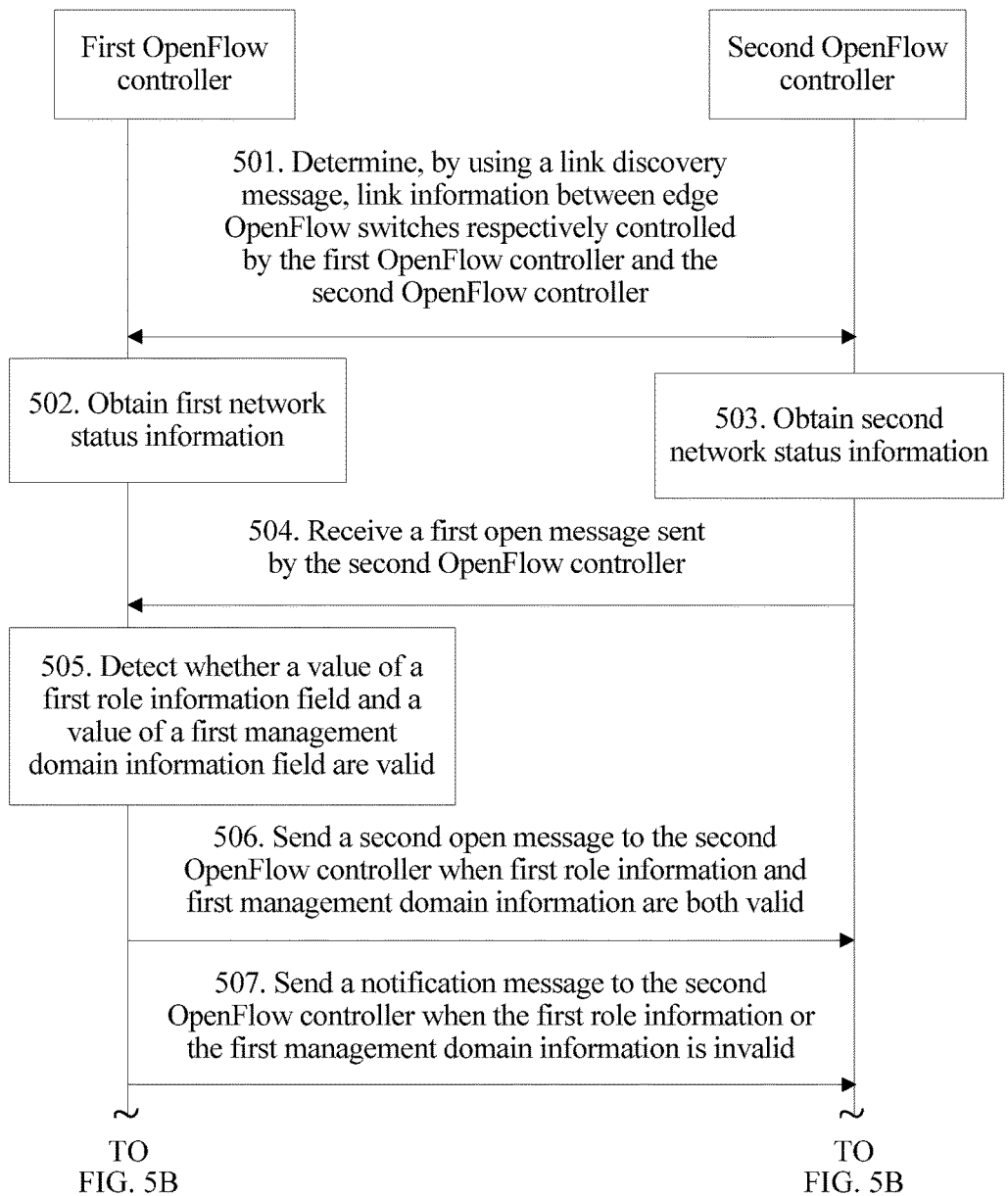
FIG. 5A and FIG. 5B are a flowchart of a network topology determining method according to Embodiment 3 of the present disclosure.
Figure 5B:
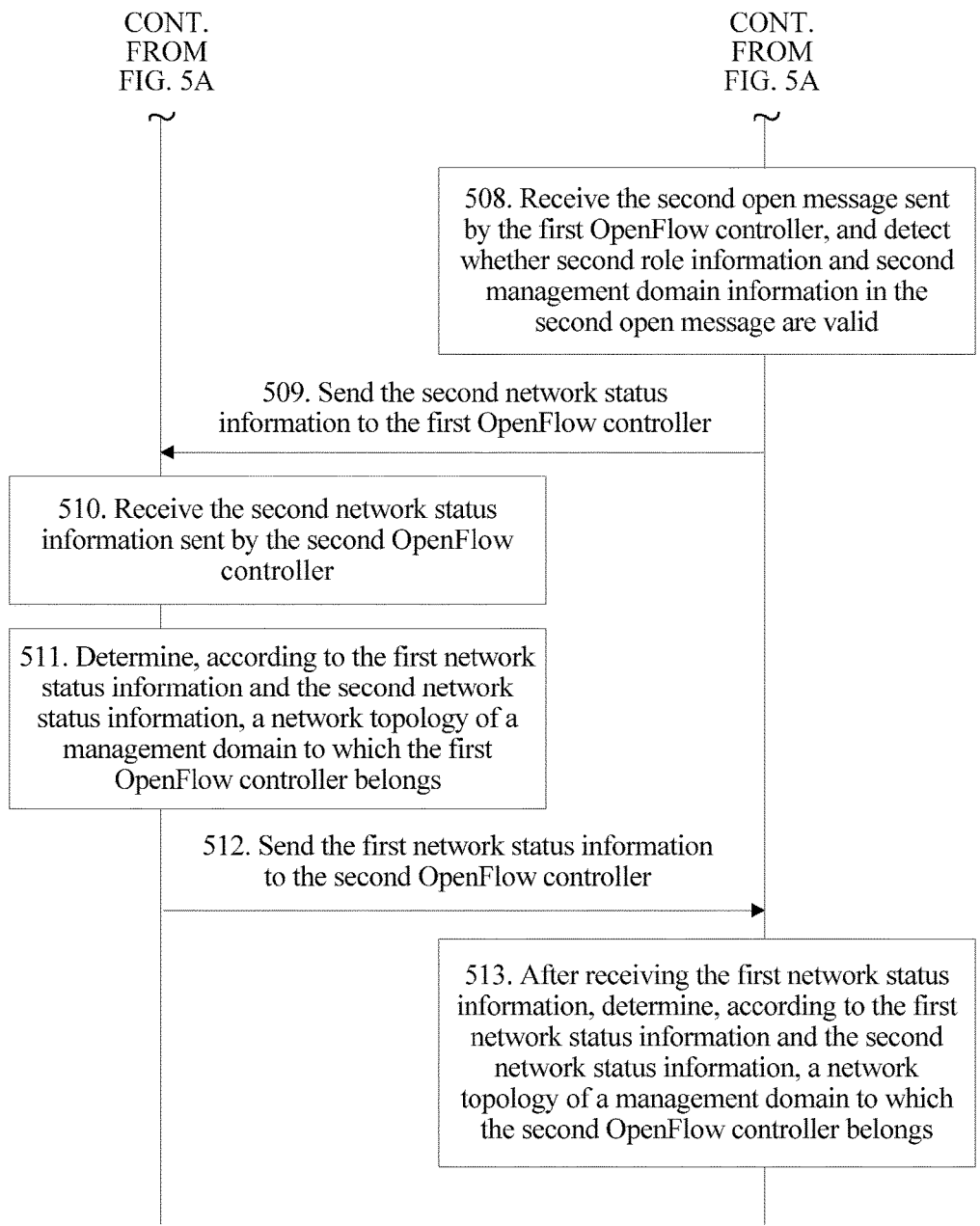

Based on the architecture shown in FIG. 4, this embodiment of the present disclosure provides a network topology determining method. Referring to FIG. 5A and FIG. 5B, the method includes the following steps.

Step 501: Determine, using a link discovery message, link information between an edge OpenFlow switch controlled by the first OpenFlow controller and an edge OpenFlow switch controlled by the second OpenFlow controller.

The first OpenFlow controller and the second OpenFlow controller determine link information between subnets controlled by the first OpenFlow controller and the second OpenFlow controller, by controlling transferring of the link discovery message between OpenFlow switches on edges of the two subnets (that is, OpenFlow networks) controlled by the first OpenFlow controller and the second OpenFlow controller.

In this embodiment, the first OpenFlow controller and the second OpenFlow controller belong to different OpenFlow networks, and for example, belong to an OpenFlow network 1 and an OpenFlow network 2.

Step 502: The first OpenFlow controller obtains first network status information.

Step 503: The second OpenFlow controller obtains second network status information.

Step 504: The first OpenFlow controller receives a first open message sent by the second OpenFlow controller.

Step 505: The first OpenFlow controller detects whether first role information and first management domain information are valid. If the first role information and the first management domain information are valid, perform step 506; or if the first role information or the first management domain information is invalid, perform step 507.

Step 506: The first OpenFlow controller sends a second open message to the second OpenFlow controller.

Step 507: The first OpenFlow controller sends a notification message to the second OpenFlow controller.

Step 508: The second OpenFlow controller receives the second open message sent by the first OpenFlow controller, and detects whether second role information and second management domain information in the second open message are valid.

Step 509: The second OpenFlow controller sends the second network status information to the first OpenFlow controller.

Step 510: The first OpenFlow controller receives the second network status information sent by the second OpenFlow controller.

Step 511: The first OpenFlow controller determines, according to the first network status information and the second network status information, a network topology of a management domain to which the first OpenFlow controller belongs.

Step 512: The first OpenFlow controller sends the first network status information to the second OpenFlow controller.

Step 513: After receiving the first network status information, the second OpenFlow controller determines, according to the first network status information and the second network status information, a network topology of a management domain to which the second OpenFlow controller belongs.

Implementation methods of steps 501 to 513 are respectively the same as those of the foregoing steps 301 to 313, and details are not described herein again.

In this embodiment of the present disclosure, a first OpenFlow controller determines a network topology of a management domain to which the first OpenFlow controller belongs by obtaining internal network status information and border network status information (that is, first network status information) of an OpenFlow network of the first OpenFlow controller and receiving second network status information sent by a second OpenFlow controller. In addition, the second OpenFlow controller may also determine, according to the second network status information of the second OpenFlow controller and the received first network status information sent by the first OpenFlow controller, a network topology of a management domain to which the second OpenFlow controller belongs, which facilitates uniform scheduling of resources between different devices of multiple OpenFlow networks in a same management domain. In addition, the second network status information is carried in a network layer reachability information field of an update message of the Border Gateway Protocol, and any centralized network status information storage device supporting the Border Gateway Protocol can obtain the second network status information using the update message, to determine a network topology of a management domain or a network to which the centralized network status information storage device supporting the Border Gateway Protocol belongs, with good universality.

Embodiment 4

Figure 6:
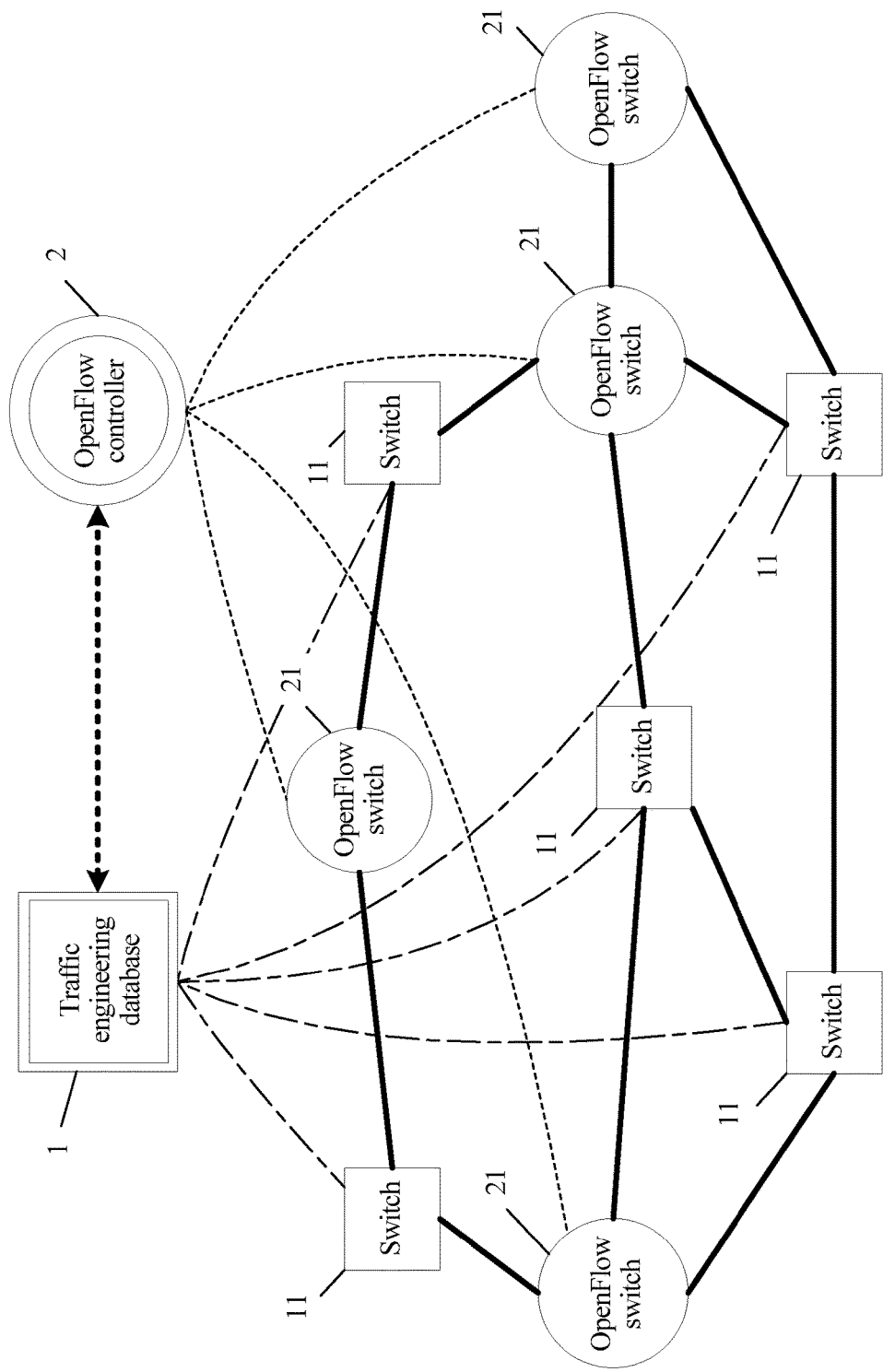
FIG. 6 is a diagram of an application scenario of still another network topology determining method according to an embodiment of the present disclosure.

To better understand a technical solution provided in Embodiment 4 of the present disclosure, the following describes an application scenario (a scenario in which an autonomous system includes an OpenFlow controller and another centralized network status information storage device (such as a TED) other than the OpenFlow controller) of Embodiment 4 with reference to FIG. 6. FIG. 6 shows a network architecture of a management domain. Referring to FIG. 6, a traffic engineering database 1, an OpenFlow controller 2, an OpenFlow switch 21, and a switch 11 are deployed in the network. The traffic engineering database 1 and the OpenFlow controller 2 communicate with each other. One OpenFlow controller 2 may control multiple OpenFlow switches 21, and one traffic engineering database 1 may control multiple switches 11. In addition, the OpenFlow switch 21 and the switch 11 are physically connected.

In this embodiment, a first centralized network status information storage device and a second centralized network status information storage device are located in a same autonomous system. That is, the first centralized network status information storage device is the OpenFlow controller, and the second centralized network status information storage device is the another centralized network status information storage device (such as the TED in FIG. 6) other than the OpenFlow controller.

During implementation, the first centralized network status information storage device is the OpenFlow controller, and the second centralized network status information storage device is the another centralized network status information storage device other than the OpenFlow controller; or the first centralized network status information storage device is the another centralized network status information storage device other than the OpenFlow controller, and the second centralized network status information storage device is the OpenFlow controller. In this embodiment, that the first centralized network status information storage device is the OpenFlow controller and the second centralized network status information storage device is the another centralized network status information storage device other than the OpenFlow controller is used as an example for description.

Figure 7A:
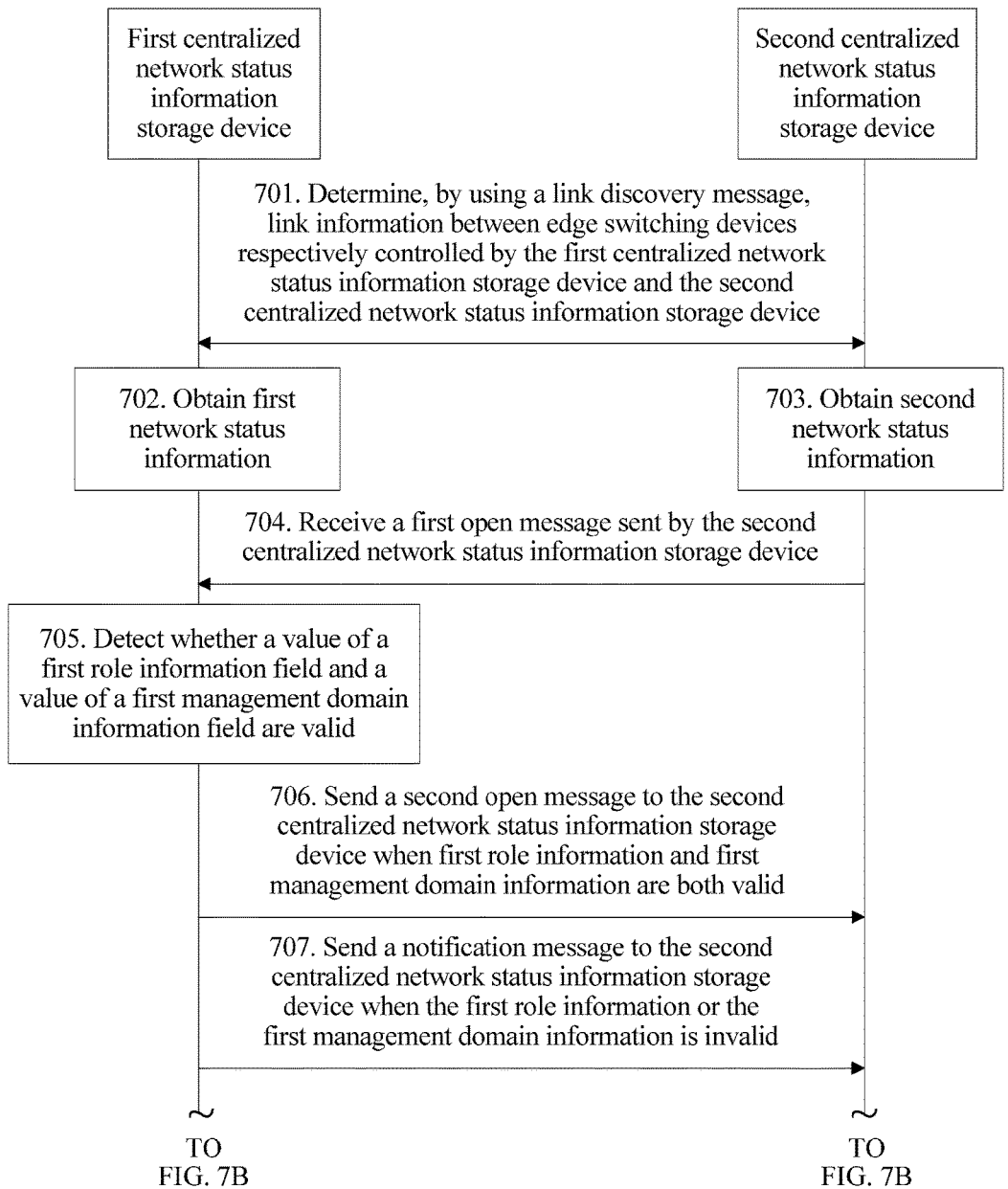
FIG. 7A and FIG. 7B are a flowchart of a network topology determining method according to Embodiment 4 of the present disclosure.
Figure 7B:
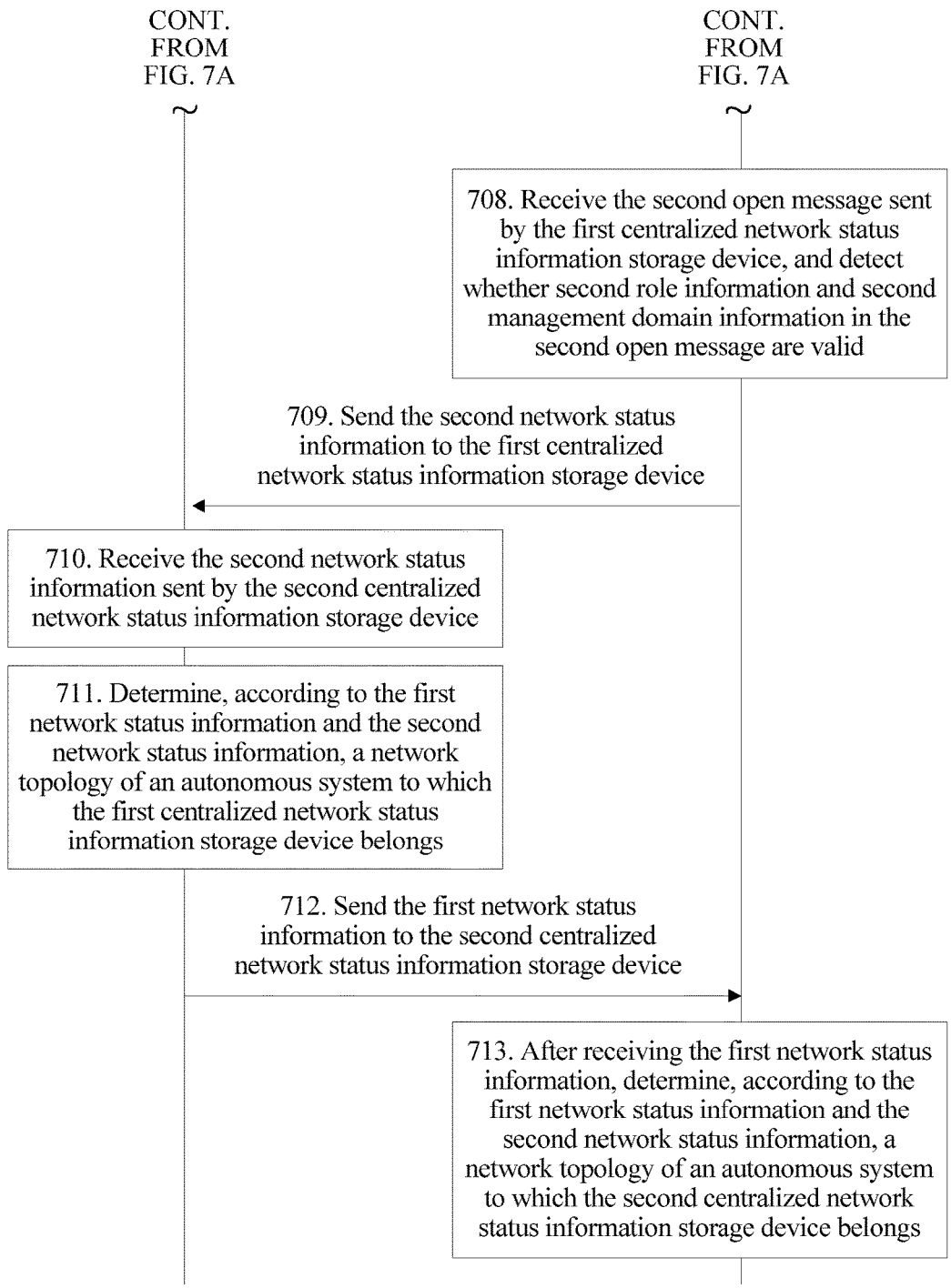

Based on the architecture shown in FIG. 6, this embodiment of the present disclosure provides a network topology determining method. Referring to FIG. 7A and FIG. 7B, the method includes the following steps.

Step 701: Determine, using a link discovery message, link information between an edge first switching device controlled by the first centralized network status information storage device and an edge third switching device associated with the second centralized network status information storage device.

This step is the same as step 301, and details are not described herein again.

Step 702: The first centralized network status information storage device obtains first network status information.

Step 703: The second centralized network status information storage device obtains second network status information.

Step 704: The first centralized network status information storage device receives a first open message sent by the second centralized network status information storage device.

Step 705: The first centralized network status information storage device detects whether first role information and first management domain information are valid. If the first role information and the first management domain information are valid, perform step 706; or if the first role information or the first management domain information is invalid, perform step 707.

Step 706: The first centralized network status information storage device sends a second open message to the second centralized network status information storage device.

Step 707: The first centralized network status information storage device sends a notification message to the second centralized network status information storage device.

Step 708: The second centralized network status information storage device receives the second open message sent by the first centralized network status information storage device.

Step 709: The second centralized network status information storage device sends the second network status information to the first centralized network status information storage device.

Step 710: The first centralized network status information storage device receives the second network status information sent by the second centralized network status information storage device.

Step 711: The first centralized network status information storage device determines, according to the first network status information and the second network status information, a network topology of an autonomous system to which the first centralized network status information storage device belongs.

Step 712: The first centralized network status information storage device sends the first network status information to the second centralized network status information storage device.

Step 713: After receiving the first network status information, the second centralized network status information storage device determines, according to the first network status information and the second network status information, a network topology of an autonomous system to which the second centralized network status information storage device belongs.

Implementation methods of step 701 to step 713 are respectively the same as those of steps 301 to 313, and details are not described herein again.

In this embodiment of the present disclosure, a network topology of a network in which a device controlled by an OpenFlow controller and a device associated with a non-OpenFlow controller co-exist is determined using first network status information obtained by and second network status information received by a first centralized network status information storage device, where the second network status information is sent by a second centralized network status information storage device in a same autonomous system. The network topology of the network is determined, which facilitates uniform scheduling of resources between the device controlled by the OpenFlow controller and the device associated with the non-OpenFlow controller in the same autonomous system. In addition, the second network status information is carried in a network layer reachability information field of an update message of the Border Gateway Protocol, and any centralized network status information storage device supporting the Border Gateway Protocol can obtain the second network status information using the update message, to determine a network topology of a management domain or a network to which the centralized network status information storage device supporting the Border Gateway Protocol belongs, with good universality.

Embodiment 5

Figure 8:
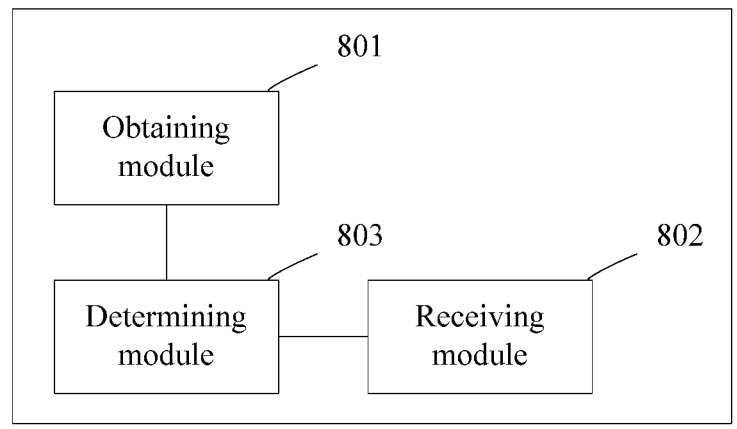
FIG. 8 is a schematic structural diagram of a network topology determining apparatus according to an embodiment of the present disclosure.

This embodiment of the present disclosure provides a network topology determining apparatus. Referring to FIG. 8, the apparatus includes an obtaining module 801, a receiving module 802, and a determining module 803.

The obtaining module 801 is configured to obtain first network status information. The first network status information includes device information of first switching devices, link information between the first switching devices, device information of second switching devices connected to the first switching devices, and link information between the first switching devices and the second switching devices that are respectively connected to the first switching devices. The first switching device is a switching device that is controlled by or associated with a first centralized network status information storage device, and the second switching device is a switching device that is not controlled by or associated with the first centralized network status information storage device.

The receiving module 802 is configured to receive second network status information sent by a second centralized network status information storage device. The second network status information includes device information of third switching devices, link information between the third switching devices, device information of fourth switching devices connected to the third switching devices, and link information between the third switching devices and the fourth switching devices that are respectively connected to the third switching devices. The third switching device is a switching device that is controlled by or associated with the second centralized network status information storage device, and the fourth switching device is a switching device that is not controlled by or associated with the second centralized network status information storage device. The second network status information is carried in a network layer reachability information field of an update message of the Border Gateway Protocol.

The determining module 803 is configured to determine, according to the first network status information and the second network status information, a network topology of a management domain or an autonomous system to which the first centralized network status information storage device belongs.

At least one of the first centralized network status information storage device or the second centralized network status information storage device is an OpenFlow controller, and the first centralized network status information storage device and the second centralized network status information storage device belong to different autonomous systems in a same management domain, or the first centralized network status information storage device and the second centralized network status information storage device belong to a same autonomous system in a same management domain.

In this embodiment of the present disclosure, a network topology of a management domain or a network to which a first centralized network status information storage device belongs is determined by obtaining first network status information of the first centralized network status information storage device and receiving second network status information sent by a second centralized network status information storage device, which facilitates uniform scheduling of resources between different devices in a same management domain or a same network. In addition, the second network status information is carried in a network layer reachability information field of an update message of the Border Gateway Protocol, and any centralized network status information storage device supporting the Border Gateway Protocol can obtain the second network status information using the update message, to determine a network topology of a management domain or a network to which the centralized network status information storage device supporting the Border Gateway Protocol belongs, with good universality.

Embodiment 6

Figure 9:
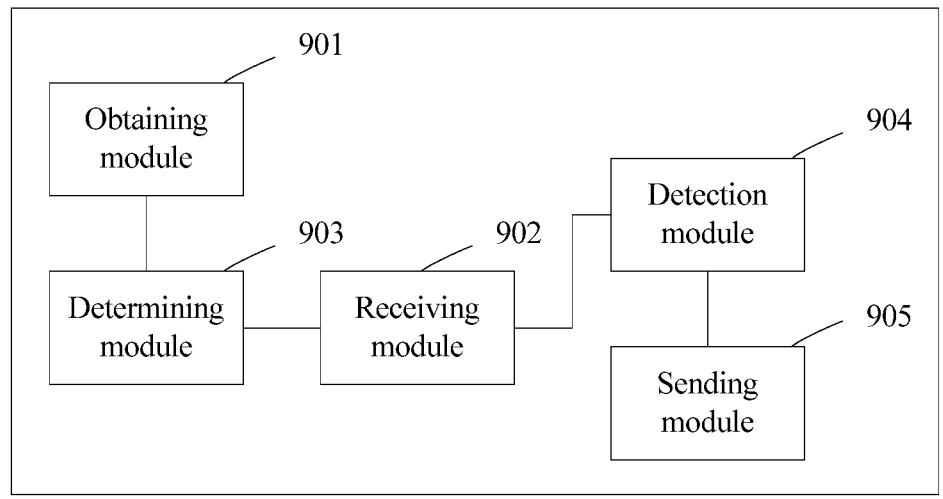
FIG. 9 is a schematic structural diagram of a network topology determining apparatus according to an embodiment of the present disclosure.

This embodiment of the present disclosure provides a network topology determining apparatus. Referring to FIG. 9, the apparatus includes an obtaining module 901, a receiving module 902, a determining module 903, a detection module 904, and a sending module 905.

The obtaining module 901 is configured to obtain first network status information. The first network status information includes device information of first switching devices, link information between the first switching devices, device information of second switching devices connected to the first switching devices, and link information between the first switching devices and the second switching devices that are respectively connected to the first switching devices. The first switching device is a switching device that is controlled by or associated with a first centralized network status information storage device, and the second switching device is a switching device that is not controlled by or associated with the first centralized network status information storage device.

The receiving module 902 is configured to receive second network status information sent by a second centralized network status information storage device. The second network status information includes device information of third switching devices, link information between the third switching devices, device information of fourth switching devices connected to the third switching devices, and link information between the third switching devices and the fourth switching devices that are respectively connected to the third switching devices. The third switching device is a switching device that is controlled by or associated with the second centralized network status information storage device, and the fourth switching device is a switching device that is not controlled by or associated with the second centralized network status information storage device. The second network status information is carried in a network layer reachability information field of an update message of the Border Gateway Protocol.

The determining module 903 is configured to determine, according to the first network status information and the second network status information, a network topology of a management domain or an autonomous system to which the first centralized network status information storage device belongs.

At least one of the first centralized network status information storage device or the second centralized network status information storage device is an OpenFlow controller, and the first centralized network status information storage device and the second centralized network status information storage device belong to different autonomous systems in a same management domain, or the first centralized network status information storage device and the second centralized network status information storage device belong to a same autonomous system in a same management domain.

During implementation, the first centralized network status information storage device and the second centralized network status information storage device are devices supporting the Border Gateway Protocol, and the device supporting the Border Gateway Protocol includes an OpenFlow controller, a routing server, a route reflector, a traffic engineering database server, or a network management system server.

Further, the network layer reachability information field includes a link status network layer reachability information field, where the link status network layer reachability information field is used to indicate a source of network layer reachability information, and the source includes multiple versions of OpenFlow protocols.

The receiving module 902 is further configured to receive a first open message sent by the second centralized network status information storage device. The first open message includes a first role information field and a first management domain information field, where the first role information field is used to carry device information of the second centralized network status information storage device, and the first management domain information field is used to carry a management domain to which the second centralized network status information storage device belongs.

The detection module 904 is configured to detect whether a value of the first role information field and a value of the first management domain information field are valid.

The sending module 905 is configured to send a second open message to the second centralized network status information storage device when the value of the first role information field and the value of the first management domain information field are both valid. The second open message includes a second role information field and a second management domain information field, where the second role information field is used to carry device information of the first centralized network status information storage device, and the second management domain information field is used to carry the management domain to which the first centralized network status information storage device belongs.

The sending module 905 is further configured to send a notification message to the second centralized network status information storage device when the value of the first role information field or the value of the first management domain information field is invalid. The notification message is used to indicate that the first open message is incorrect.

The notification message further carries a reason for incorrectness of the first open message, and the reason for the incorrectness of the first open message includes an invalid role and an invalid management domain. The invalid role is used to indicate that the device information of the second centralized network status information storage device is invalid, and the invalid management domain is used to indicate that the second centralized network status information storage device is not in the management domain to which the first centralized network status information storage device belongs.

During implementation, the link information between the first switching device and the second switching device is determined using a link discovery message, and the link information between the third switching device and the fourth switching device is determined using the link discovery message.

During implementation, the determining module 903 may be further configured to determine, according to the device information of the switching devices in the first network status information and the second network status information, link information between switching devices in the management domain or the autonomous system to which the first centralized network status information storage device belongs, so as to determine the network topology of the management domain or the autonomous system to which the first centralized network status information storage device belongs. The device information includes a device identifier and a port number.

In this embodiment of the present disclosure, a network topology of a management domain or a network to which a first centralized network status information storage device belongs is determined by obtaining first network status information of the first centralized network status information storage device and receiving second network status information sent by a second centralized network status information storage device, which facilitates uniform scheduling of resources between different devices in a same management domain or a same network. In addition, the second network status information is carried in a network layer reachability information field of an update message of the Border Gateway Protocol, and any centralized network status information storage device supporting the Border Gateway Protocol can obtain the second network status information using the update message, to determine a network topology of a management domain or a network to which the centralized network status information storage device supporting the Border Gateway Protocol belongs, with good universality.

Embodiment 7

Figure 10:
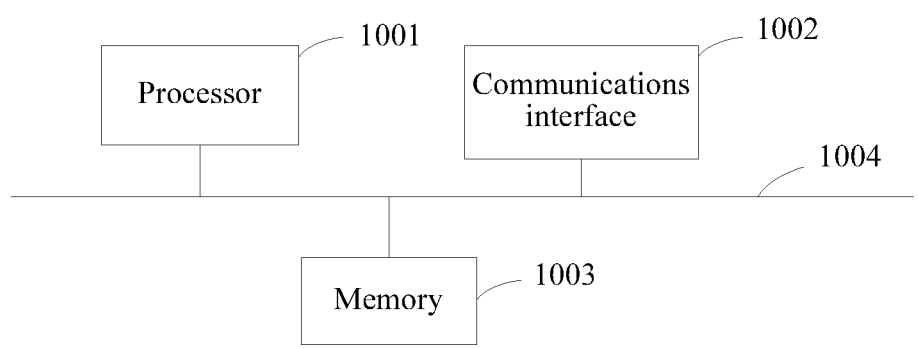
FIG. 10 is a schematic structural diagram of a centralized network status information storage device according to an embodiment of the present disclosure.

This embodiment of the present disclosure provides a centralized network status information storage device. Referring to FIG. 10, the device may be a server. Generally, the device includes at least one processor 1001 (such as a central processing unit (CPU)), at least one communications interface 1002, a memory 1003, and at least one communications bus 1004. The memory 1003 is configured to store an execution instruction of a computer, and the processor 1001 and the memory 1003 are connected using the bus 1004. When the computer runs, the processor 1001 executes the execution instruction of the computer stored in the memory 1003, such that the computer executes the network topology determining method in Embodiment 1, Embodiment 2, Embodiment 3, or Embodiment 4.

A person skilled in the art may understand that a structure of the server shown in FIG. 10 does not constitute any limitation on a switching device, and instead the server may include parts fewer or more than those shown in FIG. 10, or a combination of some parts, or parts disposed differently.

The following describes the constituent parts of the switching device in detail with reference to FIG. 10.

The communications bus 1004 is configured to implement connection and communication between the processor 1001, the memory 1003, and the communications interface 1002.

The at least one communications interface 1002 (which may be wired or wireless) implements communicative connection between the switching device and at least two other computers (such as hosts), and between the switching device and one server (such as a controller) (the computers and the server may be separately connected to the switching device by sharing one communications interface 1002). The Internet, a wide area network, a local area network, a metropolitan area network, or the like may be used.

The memory 1003 may be configured to store a software program and an application module. By running the software program and the application module that are stored in the memory 1003, the processor 1001 performs various functional applications of the witching device and data processing. The memory 1003 may mainly include a program storage area and a data storage area. The program storage area may store an operating system, an application program required for at least one function (such as a matching function and an execution instruction function of an entry of a flow table), and the like. The data storage area may store data (such as a stored flow table and database) created according to usage of the switching device, and the like. In addition, the memory 1003 may include a high-speed random access memory (RAM), and may further include a non-volatile memory, such as at least one disk storage component, a flash memory component, or another volatile solid state storage component.

The processor 1001 is a control center of the switching device, is connected to each part of the entire switching device using various interfaces and lines, and by running or executing a software program and/or an application module that are/is stored in the memory 1003 and by invoking data stored in the memory 1003, performs various functions of the switching device and data processing, so as to perform overall monitoring on the switching device.

The processor 1001 may implement obtaining first network status information by running or executing a software program and/or an application module that are/is stored in the memory 1003 and by invoking data stored in the memory 1003. The first network status information includes device information of first switching devices, link information between the first switching devices, device information of second switching devices connected to the first switching devices, and link information between the first switching devices and the second switching devices that are respectively connected to the first switching devices. The first switching device is a switching device that is controlled by or associated with a first centralized network status information storage device, and the second switching device is a switching device that is not controlled by or associated with the first centralized network status information storage device.

The communications interface 1002 may implement receiving second network status information sent by a second centralized network status information storage device. The second network status information includes device information of third switching devices, link information between the third switching devices, device information of fourth switching devices connected to the third switching devices, and link information between the third switching devices and the fourth switching devices that are respectively connected to the third switching devices. The third switching device is a switching device that is controlled by or associated with the second centralized network status information storage device, and the fourth switching device is a switching device that is not controlled by or associated with the second centralized network status information storage device. The second network status information is carried in a network layer reachability information field of an update message of the Border Gateway Protocol.

The processor 1001 may further implement determining, according to the first network status information and the second network status information, a network topology of a management domain or an autonomous system to which the first centralized network status information storage device belongs.

At least one of the first centralized network status information storage device or the second centralized network status information storage device is an OpenFlow controller, and the first centralized network status information storage device and the second centralized network status information storage device belong to different autonomous systems in a same management domain, or the first centralized network status information storage device and the second centralized network status information storage device belong to a same autonomous system in a same management domain.

Preferably, the first centralized network status information storage device and the second centralized network status information storage device are devices supporting the Border Gateway Protocol, and the device supporting the Border Gateway Protocol includes an OpenFlow controller, a routing server, a route reflector, a traffic engineering database server, or a network management system server.

Preferably, the second network status information is carried in the network layer reachability information field of the update message of the Border Gateway Protocol. Further, the network layer reachability information field includes a link status network layer reachability information field, where the link status network layer reachability information field is used to indicate a source of network layer reachability information, and the source includes multiple versions of OpenFlow protocols.

Preferably, the communications interface 1002 may further implement receiving a first open message sent by the second centralized network status information storage device. The first open message includes a first role information field and a first management domain information field, where the first role information field is used to carry device information of the second centralized network status information storage device, and the first management domain information field is used to carry a management domain to which the second centralized network status information storage device belongs.

The processor 1001 may further implement detecting whether a value of the first role information field and a value of the first management domain information field are valid.

When the value of the first role information field and the value of the first management domain information field are both valid, the communications interface 1002 may further implement sending a second open message to the second centralized network status information storage device. The second open message includes a second role information field and a second management domain information field, where the second role information field is used to carry device information of the first centralized network status information storage device, and the second management domain information field is used to carry the management domain to which the first centralized network status information storage device belongs.

When the value of the first role information field or the value of the first management domain information field is invalid, the communications interface 1002 may further implement sending a notification message to the second centralized network status information storage device. The notification message is used to indicate that the first open message is incorrect.

During implementation, the notification message further carries a reason for incorrectness of the first open message, and the reason for the incorrectness of the first open message includes an invalid role and an invalid management domain. The invalid role is used to indicate that the device information of the second centralized network status information storage device is invalid, and the invalid management domain is used to indicate that the second centralized network status information storage device is not in the management domain to which the first centralized network status information storage device belongs.

During implementation, the link information between the first switching device and the second switching device is determined using a link discovery message, and the link information between the third switching device and the fourth switching device is determined using the link discovery message.

During implementation, the processor 1001 is further configured to determine, according to the device information of the switching devices in the first network status information and the second network status information, link information between switching devices in the management domain or the autonomous system to which the first centralized network status information storage device belongs, so as to determine the network topology of the management domain or the autonomous system to which the first centralized network status information storage device belongs. The device information includes a device identifier and a port number.

In this embodiment of the present disclosure, a network topology of a management domain or a network to which a first centralized network status information storage device belongs is determined by obtaining first network status information of the first centralized network status information storage device and receiving second network status information sent by a second centralized network status information storage device, which facilitates uniform scheduling of resources between different devices in a same management domain or a same network. In addition, the second network status information is carried in a network layer reachability information field of an update message of the Border Gateway Protocol, and any centralized network status information storage device supporting the Border Gateway Protocol can obtain the second network status information using the update message, to determine a network topology of a management domain or a network to which the centralized network status information storage device supporting the Border Gateway Protocol belongs, with good universality.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A network topology determining method, comprising:
    obtaining first network status information, wherein the first network status information comprises device information of first switching devices, link information between the first switching devices, device information of second switching devices connected to the first switching devices, and link information between the first switching devices and the second switching devices, wherein a first switching device selected from the first switching devices is a switching device that is controlled by or associated with a first centralized network status information storage device, and wherein a second switching device selected from the second switching devices is a switching device that is not controlled by or associated with the first centralized network status information storage device;
    receiving second network status information sent by a second centralized network status information storage device, wherein the second network status information comprises device information of third switching devices, link information between the third switching devices, device information of fourth switching devices connected to the third switching devices, and link information between the third switching devices and the fourth switching devices, wherein a third switching device selected from the third switching devices is a switching device that is controlled by or associated with the second centralized network status information storage device, and wherein a fourth switching device selected from the fourth switching devices is a switching device that is not controlled by or associated with the second centralized network status information storage device; and
    determining, according to the first network status information and the second network status information, a network topology of a management domain or an autonomous system to which the first centralized network status information storage device belongs,
    wherein at least one of the first centralized network status information storage device or the second centralized network status information storage device is an OpenFlow controller, and
    wherein the first centralized network status information storage device and the second centralized network status information storage device belong to a same management domain.

2. The method according to claim 1, wherein the first centralized network status information storage device and the second centralized network status information storage device are devices supporting the Border Gateway Protocol, and wherein the device supporting the Border Gateway Protocol comprises an OpenFlow controller, a routing server, a route reflector, a traffic engineering database server, or a network management system server.

3. The method according to claim 1, wherein the second network status information is carried in a network layer reachability information field of an update message of the Border Gateway Protocol, wherein the network layer reachability information field comprises a link status network layer reachability information field, wherein the link status network layer reachability information field is used to indicate a source of network layer reachability information, and wherein the source comprises multiple versions of OpenFlow protocols.

4. The method according to claim 1, wherein before receiving the second network status information sent by the second centralized network status information storage device, the method further comprises:
    receiving a first open message sent by the second centralized network status information storage device, wherein the first open message comprises a first role information field and a first management domain information field, wherein the first role information field is used to carry device information of the second centralized network status information storage device, and wherein the first management domain information field is used to carry a management domain to which the second centralized network status information storage device belongs;
    detecting whether a value of the first role information field and a value of the first management domain information field are valid; and
    sending a second open message to the second centralized network status information storage device when the value of the first role information field and the value of the first management domain information field are both valid,
    wherein the second open message comprises a second role information field and a second management domain information field,
    wherein the second role information field is used to carry device information of the first centralized network status information storage device, and
    wherein the second management domain information field is used to carry the management domain to which the first centralized network status information storage device belongs.

5. The method according to claim 4, wherein the method further comprises sending a notification message to the second centralized network status information storage device when the value of the first role information field or the value of the first management domain information field is invalid, wherein the notification message is used to indicate that the first open message is incorrect.

6. The method according to claim 5, wherein the notification message further carries a reason for incorrectness of the first open message, wherein the reason for the incorrectness of the first open message comprises an invalid role and an invalid management domain, wherein the invalid role is used to indicate that the device information of the second centralized network status information storage device is invalid, and wherein the invalid management domain is used to indicate that the second centralized network status information storage device is not in the management domain to which the first centralized network status information storage device belongs.

7. The method according to claim 1, wherein the link information between the first switching device and the second switching device is determined using a link discovery message, and wherein the link information between the third switching device and the fourth switching device is determined using the link discovery message.

8. The method according to claim 1, wherein determining, according to the first network status information and the second network status information, the network topology of the management domain or the autonomous system to which the first centralized network status information storage device belongs comprises determining, according to the device information of the switching devices in the first network status information and the second network status information, link information between switching devices in the management domain or the autonomous system to which the first centralized network status information storage device belongs to determine the network topology of the management domain or the autonomous system to which the first centralized network status information storage device belongs, wherein the device information comprises a device identifier and a port number.

9. A network topology determining apparatus, comprising:
a memory configured to store instructions; and
a processor coupled to the memory and configured to execute the instructions to:
obtain first network status information, wherein the first network status information comprises device information of first switching devices, link information between the first switching devices, device information of second switching devices connected to the first switching devices, and link information between the first switching devices and the second switching devices, wherein a first switching device selected from the first switching devices is a switching device that is controlled by or associated with a first centralized network status information storage device, and wherein a second switching device selected from the second switching devices is a switching device that is not controlled by or associated with the first centralized network status information storage device;
receive second network status information sent by a second centralized network status information storage device, wherein the second network status information comprises device information of third switching devices, link information between the third switching devices, device information of fourth switching devices connected to the third switching devices, and link information between the third switching devices and the fourth switching devices, wherein a third switching device selected from the third switching devices is a switching device that is controlled by or associated with the second centralized network status information storage device, and wherein a fourth switching device selected from the fourth switching device is a switching device that is not controlled by or associated with the second centralized network status information storage device; and
determine, according to the first network status information and the second network status information, a network topology of a management domain or an autonomous system to which the first centralized network status information storage device belongs,
wherein at least one of the first centralized network status information storage device or the second centralized network status information storage device is an OpenFlow controller, and
wherein the first centralized network status information storage device and the second centralized network status information storage device belong to a same management domain.

10. The apparatus according to claim 9, wherein the first centralized network status information storage device and the second centralized network status information storage device are devices supporting the Border Gateway Protocol, and wherein the device supporting the Border Gateway Protocol comprises an OpenFlow controller, a routing server, a route reflector, a traffic engineering database server, or a network management system server.

11. The apparatus according to claim 9, wherein the second network status information is carried in a network layer reachability information field of an update message of the Border Gateway Protocol, wherein the network layer reachability information field comprises a link status network layer reachability information field, wherein the link status network layer reachability information field is used to indicate a source of network layer reachability information, and wherein the source comprises multiple versions of OpenFlow protocols.

12. The apparatus according to claim 9, wherein the processor is further configured to execute the instructions to:
receive a first open message sent by the second centralized network status information storage device, wherein the first open message comprises a first role information field and a first management domain information field, wherein the first role information field is used to carry device information of the second centralized network status information storage device, and wherein the first management domain information field is used to carry a management domain to which the second centralized network status information storage device belongs;
detect whether a value of the first role information field and a value of the first management domain information field are valid; and
send a second open message to the second centralized network status information storage device when the value of the first role information field and the value of the first management domain information field are both valid,
wherein the second open message comprises a second role information field and a second management domain information field,
wherein the second role information field is used to carry device information of the first centralized network status information storage device, and
wherein the second management domain information field is used to carry the management domain to which the first centralized network status information storage device belongs.

13. The apparatus according to claim 12, wherein the processor is further configured to execute the instructions to send a notification message to the second centralized network status information storage device when the value of the first role information field or the value of the first management domain information field is invalid, wherein the notification message is used to indicate that the first open message is incorrect.

14. The apparatus according to claim 13, wherein the notification message further carries a reason for incorrectness of the first open message, and the reason for the incorrectness of the first open message comprises an invalid role and an invalid management domain, wherein the invalid role is used to indicate that the device information of the second centralized network status information storage device is invalid, and wherein the invalid management domain is used to indicate that the second centralized network status information storage device is not in the management domain to which the first centralized network status information storage device belongs.

15. The apparatus according to claim 9, wherein the link information between the first switching device and the second switching device is determined using a link discovery message, and wherein the link information between the third switching device and the fourth switching device is determined using the link discovery message.

16. The apparatus according to claim 9, wherein the processor is further configured to execute the instructions to determine, according to the device information of the switching devices in the first network status information and the second network status information, link information between switching devices in the management domain or the autonomous system to which the first centralized network status information storage device belongs to determine the network topology of the management domain or the autonomous system to which the first centralized network status information storage device belongs, wherein the device information comprises a device identifier and a port number.

17. A network topology determining system, comprising:
    a first centralized network status information storage device;
    a second centralized network status information storage device;
    a network topology determining apparatus configured to:
        obtain first network status information, wherein the first network status information comprises device information of first switching devices, link information between the first switching devices, device information of second switching devices connected to the first switching devices, and link information between the first switching devices and the second switching devices, wherein a first switching device selected from the first switching devices is a switching device that is controlled by or associated with the first centralized network status information storage device, and wherein a second switching device selected from the second switching devices is a switching device that is not controlled by or associated with the first centralized network status information storage device;
        receive second network status information sent by the second centralized network status information storage device, wherein the second network status information comprises device information of third switching devices, link information between the third switching devices, device information of fourth switching devices connected to the third switching devices, and link information between the third switching devices and the fourth switching devices, wherein a third switching device selected from the third switching devices is a switching device that is controlled by or associated with the second centralized network status information storage device, and a fourth switching device selected from wherein the fourth switching device is a switching device that is not controlled by or associated with the second centralized network status information storage device; and
        determine, according to the first network status information and the second network status information, a network topology of a management domain or an autonomous system to which the first centralized network status information storage device belongs,
    wherein at least one of the first centralized network status information storage device or the second centralized network status information storage device is an Open-Flow controller, and
    wherein the first centralized network status information storage device and the second centralized network status information storage device belong to a same management domain.

18. The system according to claim 17, wherein the first centralized network status information storage device and the second centralized network status information storage device are devices supporting the Border Gateway Protocol, and wherein the device supporting the Border Gateway Protocol comprises an OpenFlow controller, a routing server, a route reflector, a traffic engineering database server, or a network management system server.

19. The system according to claim 17, wherein the second network status information is carried in a network layer reachability information field of an update message of the Border Gateway Protocol, wherein the network layer reachability information field comprises a link status network layer reachability information field, wherein the link status network layer reachability information field is used to indicate a source of network layer reachability information, and wherein the source comprises multiple versions of Open-Flow protocols.

20. The system according to claim 17, wherein the network topology determining apparatus is further configured to execute the instructions to:
    receive a first open message sent by the second centralized network status information storage device, wherein the first open message comprises a first role information field and a first management domain information field, wherein the first role information field is used to carry device information of the second centralized network status information storage device, and wherein the first management domain information field is used to carry a management domain to which the second centralized network status information storage device belongs;
    detect whether a value of the first role information field and a value of the first management domain information field are valid; and
    send a second open message to the second centralized network status information storage device when the value of the first role information field and the value of the first management domain information field are both valid,
    wherein the second open message comprises a second role information field and a second management domain information field,
    wherein the second role information field is used to carry device information of the first centralized network status information storage device, and
    wherein the second management domain information field is used to carry the management domain to which the first centralized network status information storage device belongs.

* * * * *